(12) United States Patent
Settle et al.

(10) Patent No.: US 10,824,434 B1
(45) Date of Patent: Nov. 3, 2020

(54) DYNAMICALLY STRUCTURED SINGLE INSTRUCTION, MULTIPLE DATA (SIMD) INSTRUCTIONS

(71) Applicant: Xilinx, Inc., San Jose, CA (US)

(72) Inventors: Sean Settle, San Jose, CA (US); Ehsan Ghasemi, San Jose, CA (US); Ashish Sirasao, San Jose, CA (US); Ralph D. Wittig, Menlo Park, CA (US)

(73) Assignee: XILINX, INC., San Jose, CA (US)

( * ) Notice: Subject to any disclaimer, the term of this patent is extended or adjusted under 35 U.S.C. 154(b) by 76 days.

(21) Appl. No.: 16/204,991

(22) Filed: Nov. 29, 2018

(51) Int. Cl.
  *G06F 9/38* (2018.01)
  *G06F 9/30* (2018.01)
(52) U.S. Cl.
  CPC .......... *G06F 9/3887* (2013.01); *G06F 9/3001* (2013.01)
(58) Field of Classification Search
  None
  See application file for complete search history.

(56) References Cited

U.S. PATENT DOCUMENTS

| 7,249,350 | B2 * | 7/2007 | Wang | G06F 8/52 |
| | | | | 712/22 |
| 10,423,353 | B2 * | 9/2019 | Leidel | G11C 7/1006 |
| 2007/0233766 | A1 * | 10/2007 | Gschwind | G06F 9/30032 |
| | | | | 708/490 |
| 2008/0141012 | A1 * | 6/2008 | Yehia | G06F 9/30036 |
| | | | | 712/226 |
| 2009/0144529 | A1 * | 6/2009 | Eichenberger | G06F 8/4452 |
| | | | | 712/241 |
| 2015/0178056 | A1 * | 6/2015 | Amiri | G06F 8/443 |
| | | | | 717/151 |
| 2017/0046153 | A1 * | 2/2017 | Mahurin | G06F 9/3001 |

OTHER PUBLICATIONS

Fu, Yao et al., "8-Bit Dot-Product Acceleration" WP487 (v1.0), Jun. 27, 2017, pp. 1-15, Xilinx, Inc., San Jose, CA 95124, USA.

* cited by examiner

*Primary Examiner* — Eric Coleman
(74) *Attorney, Agent, or Firm* — Patterson + Sheridan, LLP

(57) ABSTRACT

Examples described herein relate to dynamically structured single instruction, multiple data (SIMD) instructions, and systems and circuits implementing such dynamically structured SIMD instructions. An example is a method for processing data. A first SIMD structure is determined by a processor. A characteristic of the first SIMD structure is altered by the processor to obtain a second SIMD structure. An indication of the second SIMD structure is communicated from the processor to a numerical engine. Data is packed by the numerical engine into an SIMD instruction according to the second SIMD structure. The SIMD instruction is transmitted from the numerical engine.

20 Claims, 17 Drawing Sheets

FIG. 2

| 16 | 12-s | 14-(s-1) | 12-(s-1) | ... | 14-2 | 12-2 | 14-1 | 12-1 |
|---|---|---|---|---|---|---|---|---|
| $e$ | $b_s$ | $c+d$ | $b_{(s-1)}$ | ... | $c+d$ | $b_2$ | $c+d$ | $b_1$ |

Total width: $m$

FIG. 3

| 16 | 18-s | 14-(s-1) | 12-(s-1) | ... | 14-2 | 12-2 | 14-1 | 12-1 |
|---|---|---|---|---|---|---|---|---|
| $e$ | $b_s = \widehat{b}$ | $c+d$ | $b_{(s-1)}$ | ... | $c+d$ | $b_2$ | $c+d$ | $b_1$ |

Total width: $m$

FIG. 5

| 22-s | 20-(s-1) | 12-(s-1) | 14-(s-2) | 12-(s-2) | ... | 14-2 | 12-2 | 14-1 | 12-1 |
|---|---|---|---|---|---|---|---|---|---|
| $b_s = \widehat{b}$ | $c+d$ | $b_{(s-1)}$ | $c+d$ | $b_{(s-2)}$ | ... | $c+d$ | $b_2$ | $c+d$ | $b_1$ |

Total width: $m$

DYNAMICALLY STRUCTURED SINGLE INSTRUCTION, MULTIPLE DATA (SIMD) INSTRUCTIONS

TECHNICAL FIELD

Examples of the present disclosure generally relate to dynamically structured single instruction, multiple data (SIMD) instructions, and systems and circuits implementing such dynamically structured SIMD instructions.

BACKGROUND

Single instruction, multiple data (SIMD) instructions are generally implemented in systems that have or permit parallel operations to be performed simultaneously on data. A SIMD instruction can cause the system to simultaneously process the same or different data in parallel according to the function(s) indicated by the instruction. Such SIMD instructions can provide faster and more efficient processing by performing more processing during a given time.

SUMMARY

Examples described herein relate to dynamically structured single instruction, multiple data (SIMD) instructions, and systems and circuits implementing such dynamically structured SIMD instructions. Efficiency can be gained by dynamically structuring an SIMD instruction, such as by reducing a number of executions of instructions, when implementing a dynamic SIMD structure that includes compressed data.

An example is a method for processing data. A first single instruction, multiple data (SIMD) structure is determined by a processor. A characteristic of the first SIMD structure is altered by the processor to obtain a second SIMD structure. An indication of the second SIMD structure is communicated from the processor to a numerical engine. Data is packed by the numerical engine into an SIMD instruction according to the second SIMD structure. The SIMD instruction is transmitted from the numerical engine.

In another example, system for processing data includes numerical engine circuitry. The numerical engine circuitry comprises packing logic circuitry and unpacking logic circuitry. The numerical engine circuitry is configured to be communicatively coupled to a first processor and at least one second processor. The numerical engine circuitry is operable to receive an indication of a dynamic SIMD structure from the first processor. The dynamic SIMD structure having a number of instances of a compressed separate multiplier and at least one instance of an uncompressed separate multiplier. A number of bits of the compressed separate multiplier is less than a number of bits of the uncompressed separate multiplier. The packing logic circuitry is operable to pack data into a SIMD instruction based on the indication of the dynamic SIMD structure. The unpacking logic circuitry is operable to unpack products from a response received from the at least one second processor. Unpacking the products is based on the dynamic SIMD structure.

A further example is a method for processing data. The method uses one or more circuits to perform operations. A first single instruction, multiple data (SIMD) structure is determined. The first SIMD structure includes a number of instances of a separate multiplier and includes a minimum spacing and a padding disposed between neighboring instances of the separate multiplier. A width of the first SIMD structure is the number of instances of the separate multiplier in the first SIMD structure. A characteristic of the first SIMD structure is increased to obtain a second SIMD structure. The characteristic is the width or the padding. The second SIMD structure includes at least one compressed instance of the separate multiplier and at least one uncompressed instance of the separate multiplier. Data is packed into an SIMD instruction according to the second SIMD structure. The SIMD instruction is transmitted from the one or more circuits.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

FIG. 2 is a generalized SIMD structure, according to some examples.

FIG. 3 is a generalized SIMD structure including a compressed separate multiplier, according to some examples.

FIG. 5 is a generalized SIMD structure with an increased width by including a compressed separate multiplier, according to some examples.

To facilitate understanding, identical reference numerals have been used, where possible, to designate identical elements that are common to the figures. It is contemplated that elements of one example may be beneficially incorporated in other examples.

DETAILED DESCRIPTION

Figure 1A:
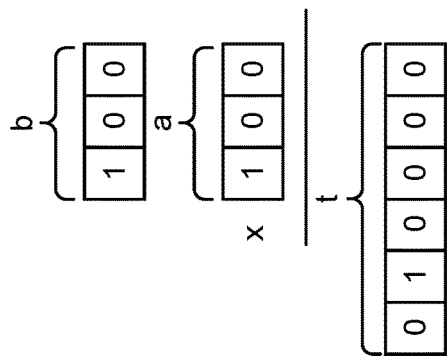
FIG. 1A depicts separate 3-bit by 3-bit multiplications.

Examples described herein relate to dynamically structured single instruction, multiple data (SIMD) instructions, and systems and circuits implementing such dynamically structured SIMD instructions. The dynamically structured SIMD instructions can include compressed data (e.g., compressed separate multipliers) to achieve increased widths of the SIMD instructions or increased padding in the SIMD instructions. By increasing the width or padding, greater efficiency in executing, e.g., multiply-accumulate (MAC) SIMD instructions can be achieved.

If a system implements a single, static SIMD structure, the system may not be able to achieve efficiencies that can be achieved as described herein. For example, a single, static SIMD structure would not permit for compressing a separate multiplier in a SIMD MAC instruction, which in turn would not permit for increasing a width or padding of the SIMD structure. Without an increased width, multiple instructions may have to be implemented to multiply data when such data may otherwise have been able to be multiplied using fewer SIMD MAC instructions that included a compressed separate multiplier. Without an increased padding, multiple instructions may have to be implemented to achieve a target cascade carry length to multiply the data when such data may otherwise have been able to be multiplied with the target cascade carry length using fewer SIMD MAC instructions that included a compressed separate multiplier. Hence, if some separate multipliers in a SIMD MAC instruction are tolerant to compression, a dynamic SIMD structure can include one or more compressed separate multipliers to achieve a greater width or padding, which can achieve greater efficiency in the system that implements the dynamic SIMD structure.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. For example, various methods according to some examples can include more or fewer operations, and the sequence of operations in various methods according to examples may be different than described herein. In addition, an illustrated example need not have all the aspects or advantages shown. An aspect or an advantage described in conjunction with a particular example is not necessarily limited to that example and can be practiced in any other examples even if not so illustrated or if not so explicitly described.

Figure 1C:
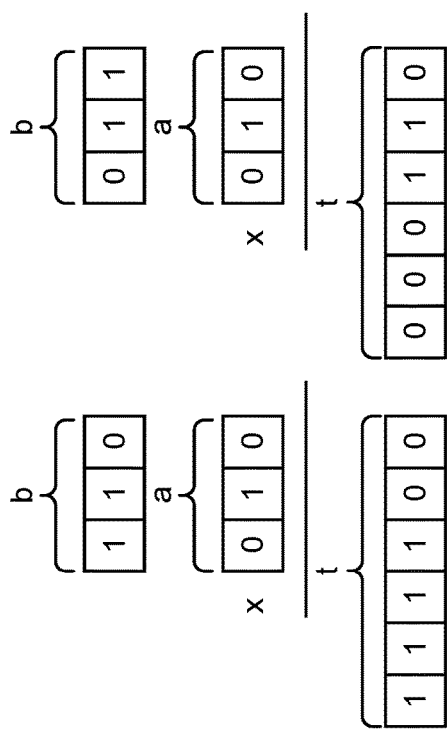
FIG. 1C depicts a product width of multiplying saturated 3-bit values.
Figure 1B:
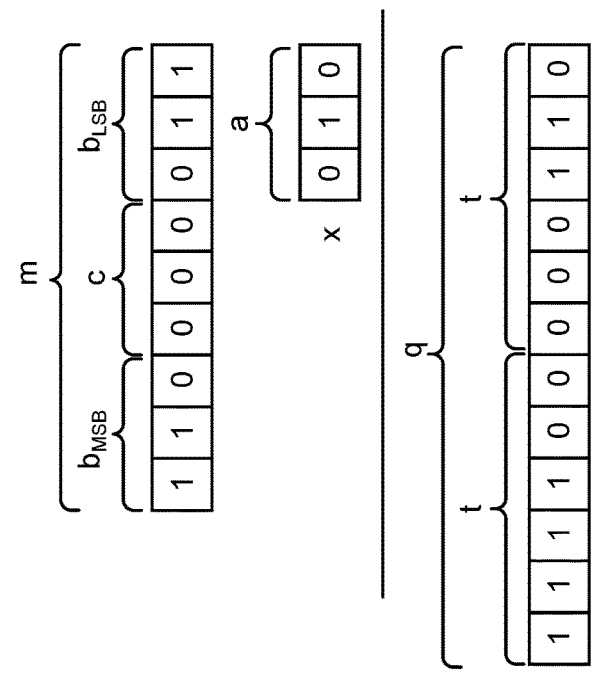
FIG. 1B is the 3-bit by 3-bit multiplications packed into a single instruction, multiple data (SIMD) structure.

Some general concepts will first be described to clarify terms and nomenclature used throughout this description. FIGS. 1A through 1C illustrate various concepts relating to a single instruction, multiple data (SIMD) structure according to some examples. FIG. 1A illustrates separate 3-bit by 3-bit multiplications, and FIG. 1B illustrates the 3-bit by 3-bit multiplications packed into a SIMD structure. Referring to FIG. 1A, separate multipliers b are b-bits in length, which in the illustrated example, are each 3-bits, and a shared multiplicand a is a-bits in length, which is also 3-bits in the illustrated example. Referring to FIG. 1C, when a b-bits multiplier and an a-bits multiplicand are saturated (e.g., −4 in the illustration, or "100"), a product width t, which is t-bits in length, results. This t-bits is the smallest number of bits implemented to accurately capture the resulting product width t. In the illustrated example, for two-complementary binary numbers, t-bits is 6-bits.

Referring to FIG. 1B, the separate multipliers b are packed into a same SIMD instruction or register. Subsequent description refers to a register m for convenience and ease of description, which may be a register in which data is stored as the source of the SIMD instruction. A minimum spacing c that is c-bits in length is between the separate multipliers b in the register. The minimum spacing c ensures that the product from the multiplication of the separate multiplier b in the least significant bits (LSBs) of the register m with the shared multiplicand a does not overflow into or contaminate the product from the multiplication of the separate multiplier b in the most significant bits (MSBs) (or next more significant bits in a more general example) of the register m with the shared multiplicand a. The products are packed in a product register q.

To pack the register m with the separate multipliers b, the separate multiplier bLSB to be packed in the LSBs of the register m is sign extended for c-bits and is inserted to the (c+b)-bits of the LSBs of the register m. The separate multiplier bmsB to be packed in the MSB of the register m is left shifted (c+b)-bits and is accumulated in the register m, which in this example, writes the separate multiplier bmsB to the b-bits of the MSB of the register m. Further details of packing separate multipliers b are described subsequently.

As will become clearer subsequently, a register m into which the separate multipliers b are packed is m-bits. Depending on the number of m-bits, the register m has a width s, which corresponds to the number of instances of separate multipliers b that can be packed into the register m.

Padding d is a number of bits, d-bits, distributed evenly between the separate multipliers b packed in the register m. In examples below, the padding d is appended with the minimum spacing c between the separate multipliers b in the register m. Some unusable bits e that are e-bits in length may be in the register m based on the m-bits and distribution of b-bits, c-bits, and d-bits therein. In some examples illustrated and described below, the unusable bits e are allocated as e-bits in MSBs of the register m.

The register n that contains the shared multiplicand a is n-bits. The shared multiplicand a can have a-bits that is equal to or less than n-bits (a<=n). That is, the shared multiplicand a can be a shorter bit length than the register n containing the shared multiplicand a.

As used herein, "a" in the context of the shared multiplicand a refers generally to the shared multiplicand a (and not a specific value for the shared multiplicand a) or the number of a-bits implemented by the shared multiplicand a, depending on the surrounding context. Similarly, "b" refers generally to the separate multipliers b (and not a specific value for any separate multiplier b) or the number of b-bits implemented for each separate multiplier b, depending on the surrounding context. Further, a letter identifying another component refers generally to that component or the number of bits implemented by that component, depending on the surrounding context. A subscript generally refers to a relative location, e.g., within the register m, where a larger number subscript is in a position within more significant bits in the register m than a smaller number subscript.

FIG. 2 illustrates a generalized SIMD structure according to some examples. FIG. 2 shows the register m with a generalized allocation of b-bits for separate multipliers b $12\text{-}1$ through $12\text{-}s$, (c+d)-bits for minimum spacing c and padding d $14\text{-}1$ through $14\text{-}(s-1)$, and e-bits for unusable bits e 16, where s in the reference numbers is the width s. The "-X" suffix to the reference numbers indicates a relative position in the register m, where "-1" indicates a position in respective LSBs in the register m, and "-s" indicates a position in respective MSBs in the register m.

The architecture of the processor(s) receiving the SIMD instruction determines the m-bits of the register m. The process or application initiating the SIMD instruction determines the b-bits of the separate multipliers b and the a-bits of the shared multiplicand a. With this information, the structure and allocation of bits in the register m can be determined.

Product Width t:

The product width t is a function of the b-bits of the separate multipliers b and the a-bits of the shared multiplicand a. Initially, the instances of the separate multipliers b each have a same, equal number of b-bits. The product width t, including a sign bit, can be obtained by determining a floor function of the binary logarithm ($\log_2$) of the product of the largest respective magnitudes of the separate multiplier b and the shared multiplicand a plus two. If, for example, the shared multiplicand a and separate multipliers b are each 8 bits, and the shared multiplicand a and the separate multipliers b can each take the full value of the 8-bit values (e.g., [−128, +127], inclusively) in two's complement, the largest magnitude of each of the shared multiplicand a and separate multipliers b is 128, and the product width t can be determined as follows in Equation (1):

$$t = \text{floor}(\log_2(128 \times 128) + 2) = 16 \qquad \text{Eq. (1)}.$$

This can be generalized if it is assumed that the values of the shared multiplicand a and separate multipliers b can be any value permitted by the a-bits and b-bits, respectively. In two's complement, the largest magnitude corresponds to the most negative number permitted by a given number of bits. Hence, the most negative number in two's complement for the shared multiplicand a and separate multipliers b would be $-2^{a-1}$ and $-2^{b-1}$, respectively. Hence, the product width t can be generalized, under this assumption, as follows in Equation (2):

$$t = \text{floor}(\log_2(2^{a-1} \times 2^{b-1}) + 2) = a + b \qquad \text{Eq. (2)}.$$

If, for example, the application or process initiating the SIMD instruction prohibits the single most negative value (and hence, has a symmetric range, e.g., [−127, +127]), the product width t can be reduced. In such a case, the values with the largest magnitude would be $+2^{a-1}-1$ and $+2^{b-1}-1$ for the shared multiplicand a and separate multipliers b, respectively. Hence, the product width t can be generalized, under this assumption, as follows in Equation (3):

$$t = \text{floor}(\log_2((2^{a-1}-1) \times (2^{b-1}-1)) + 2) \qquad \text{Eq. (3)}.$$

Applying this prohibition to the previous example in Equation (1) results in Equation (4), as follows:

$$t = \text{floor}(\log_2(127 \times 127) + 2) = 15 \qquad \text{Eq. (4)}.$$

Hence, with the floor function, the product width t can be generalized as shown in Equation (5) as follows:

$$t = a + b - 1 \qquad \text{Eq. (5)}.$$

Minimum Spacing c:

With the product width t determined, the minimum spacing c between the separate multipliers b packed in the register m can be determined. The minimum spacing c is the difference of the t-bits of the product width t less the b-bits of the separate multipliers b, as shown in Equation (6):

$$c = t - b \qquad \text{Eq. (6)}.$$

Width s:

The width s is determined by reducing the m-bits of the register m by the b-bits of the separate multiplier b in the MSB of the register m, dividing the result by the product width t, and adding one. A floor function is applied to accommodate fractional results. As illustrated in FIG. 2, the minimum spacing c (and padding d, as will be discussed subsequently) is between each neighboring pair of separate multipliers b, and no minimum spacing c is appended to the separate multiplier $b_s$ $12\text{-}s$ in the MSBs position in the register m because there is no separate multiplier b in a more significant position whose product the product from the separate multiplier $b_s$ $12\text{-}s$ could contaminate. Hence, if there are s-number of separate multipliers b, there are (s−1) number of minimum spacing c. Accordingly, conceptually, the register m can be thought of as including (s−1)-number of minimum spacing c and separate multipliers b (e.g., (s−1) number of product widths t) plus one separate multiplier b. Mathematically, this is shown in Equation (7), which is the basis for solving for the width s in Equation (8).

$$m = b + (s-1)(b+c) = b + (s-1)t \qquad \text{Eq. (7);}$$

$$s = \frac{m-b}{t} + 1. \qquad \text{Eq. (8)}$$

Since the product width t may not divide evenly into the difference of m-bits and b-bits, a floor function is applied to obtain an integer number for the width s, as shown in Equation (9):

$$s = \text{floor}\left(\frac{m-b}{t}\right) + 1. \qquad \text{Eq. (9)}$$

Padding d:

As indicated, the product width t may, in some instances, not divide evenly into the difference of m-bits and b-bits, which can result in additional bits of the register m that have not been allocated for use. The bits may be useable as padding d to permit additional serial multiply-accumulate (MAC) operations (e.g., a cascade carry chain). The padding d is between each neighboring pair of separate multipliers b, and no padding d is to be appended to the separate multiplier $b_s$ 12-s in the MSBs position in the register m, like the minimum spacing c described above. By having the padding d in these positions, additional serial MAC operations can be performed without a result from MACs corresponding to a separate multiplier b in a lower significant placement in the register m contaminating the result from the MACs corresponding to a separate multiplier b in a more significant placement in the register m. Conceptually, the register m can be thought of as including (s−1) number of minimum spacing c and separate multipliers b (e.g., (s−1) number of product widths t), (s−1) number of padding d, and plus one separate multiplier b. Mathematically, this is shown in Equation (10), which is the basis for solving for the padding d in Equation (11).

$$m = b + (s-1)(t+d) \qquad \text{Eq. (10);}$$

$$d = \frac{m-b}{(s-1)} - t. \qquad \text{Eq. (11)}$$

Since (s−1) may not divide evenly into the difference of m-bits and b-bits, a floor function is applied to obtain an integer number for the padding d, as shown in Equation (12):

$$d = \text{floor}\left(\frac{m-b}{(s-1)}\right) - t. \qquad \text{Eq. (12)}$$

A cascade carry chain length l can be determined from the padding d. Each additional d-bit of the padding d increases the cascade carry chain length by a factor of 2. Hence, the cascade carry chain length l is 2 to the power of the padding d, as shown in Equation (13):

$$l = 2^d \qquad \text{Eq. (13).}$$

Unusable Bits e:

As indicated above, (s−1) may, in some instances, not divide evenly into the difference of m-bits and b-bits, which can result in additional bits of the register m that have not been allocated for use. These bits can become unusable in some implementations since these bits cannot be evenly distributed throughout the width s of the register m. The unusable bits e can be the m-bits of the register m minus the b-bits of the separate multiplier $b_s$ 12-s and minus the product of (s−1) and the sum of the product width t and padding d, as shown in Equation (14):

$$e = m - b - (s-1)(b+c+d) \qquad \text{Eq. (14).}$$

Equation (14) shows the determination of the unusable bits e on the assumption that b is equal in each instance of a separate multiplier b in the register m, as stated previously. In some examples, this assumption may not hold true for all determinations of unusable bits e. Hence, the determination of the unusable bits e can be generalized as shown in Equation (15):

$$e = m - (s-1)(c+d) - \Sigma_{j=1}^{s} b_j \qquad \text{Eq. (15).}$$

As stated, the foregoing description for the determination of allocation of bits assumes that b for the s-instances of the separate multipliers b are equal, which permitted assumptions that product widths t are equal. In some examples, an instance of a separate multiplier b can be compressed to increase the width s and/or the padding d. In some examples, the separate multiplier b to be compressed is in the MSB position in the register m, and the other separate multipliers b have b-bits that are equal, so that the assumptions regarding equal product widths t and distribution of minimum spacing c remain true. In other examples, other separate multipliers b may be compressed in addition to the separate multiplier b in the MSB position in the register m.

If the separate multiplier $b_s$ in the MSB position of the register m is known to be compressed to a compressed separate multiplier of $\hat{b}$-bits length, as shown in FIG. 3, the allocation of bits in the register m can be determined as shown in Equations (16) and (17) below and the generalization in Equation (15) above.

$$s = \text{floor}\left(\frac{m-\hat{b}}{t}\right) + 1; \qquad \text{Eq. (16)}$$

$$d = \text{floor}\left(\frac{m-\hat{b}}{(s-1)}\right) - t. \qquad \text{Eq. (17)}$$

The product width t can be determined as indicated by Equations (2) or (5) using the b-bits of the uncompressed separate multipliers b, and the minimum spacing c can be determined as indicated by Equation (6).

By implementing Equation (16) above, the width s can be increased by the compression of the compressed separate multiplier $b_s$ 18-s, and the padding d and unusable bits e can be determined based on the increased width s. In such an implementation, an increase in width s can cause reallocation of padding d and unusable bits e, which may result in a reduced padding d, and hence, a reduced cascade carry chain length l. In other examples, the width s can be determined on an assumption that no compression is implemented, such as by using Equation (9), and Equation (17) can be implemented to permit increasing the padding d (since bits freed by the compression can be allocated to padding d without being allocated for additional width s). Increasing the padding d can increase the cascade carry chain length l.

Figure 4:
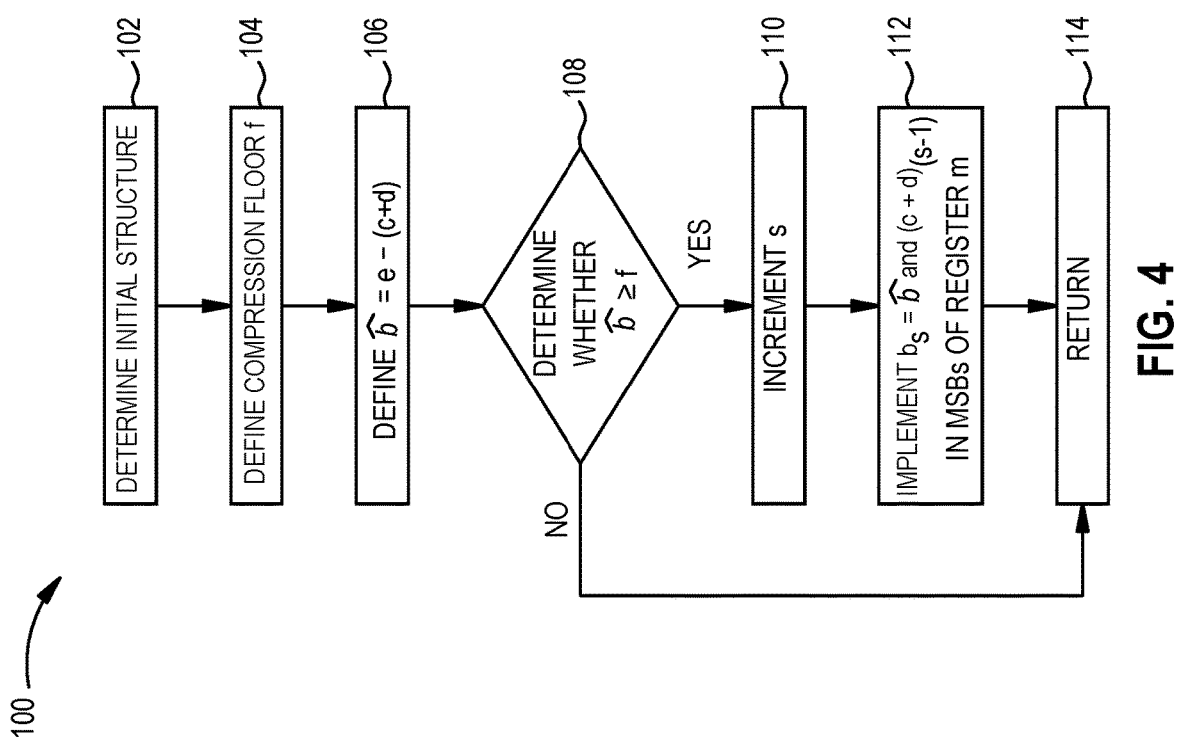
FIG. 4 is a method for increasing a SIMD width by including a compressed separate multiplier in the SIMD structure, according to some examples.

FIG. 4 is a method 100 for increasing a SIMD width by including a compressed separate multiplier $b_s=\hat{b}$ in the SIMD structure, according to some examples. FIG. 5 illustrates a generalized SIMD structure with an increased width by including a compressed separate multiplier $b_s=\hat{b}$ as described with respect to FIG. 4, according to some examples. The method 100 of FIG. 4 permits determining a compression length of $\hat{b}$-bits for a compressed separate multiplier $b_s=\hat{b}$, which permits increasing the width s of the SIMD structure.

In operation 102, an initial structure of the SIMD is determined. The initial structure can be determined as described above and illustrated in FIG. 2, in some examples. In some examples, the initial structure can be determined as described above and illustrated in FIG. 3. Other methods of determining the initial structure can be implemented.

In operation 104, a compression floor f for a compressed separate multiplier is defined. The compression floor f can be any positive integer in some examples. In some examples, the compression floor f can be determined, at least in part, by any architectural requirements of the processor that is to process the SIMD instruction. For example, an architecture of a processor may require any multiplier to be at least two bits, such as due to a symmetry requirement. Further, the compression floor f may permit defining a minimum amount, e.g., above any architectural requirement, to which a multiplier may be compressed.

In operation 106, the compressed $\hat{b}$-bits is defined to be equal the unusable bits e minus the sum of the minimum spacing c plus the padding d. Conceptually, to increase the width s of the SIMD structure in this example, the unusable bits e are to be replaced by a compressed separate multiplier $b_s=\hat{b}$, which causes a minimum spacing c and padding d to need to be appended to the separate multiplier $b_s$ in the MSB of the register m (before the width s is increased). Hence, the unusable bits e minus the sum of the minimum spacing c plus the padding d are the bits available for inserting a compressed separate multiplier $b_s=\hat{b}$, which may permit incrementing the width s.

In operation 108, a determination is made whether the compressed $\hat{b}$-bits is greater than or equal to the compression floor f. If the compressed $\hat{b}$-bits is greater than or equal to the compression floor f, the width s is incremented in operation 110. Incrementing as used herein refers to adding one to a value, whereas decrementing as used herein refers to subtracting one to a value. In operation 112, the compressed separate multiplier $b_s=\hat{b}$ and the minimum spacing c plus the padding d are implemented in the MSB of the register m. In effect, the unusable bits e 16 in the register m are replaced with the compressed separate multiplier $b_s=\hat{b}$ 22-s and the minimum spacing c plus padding d 20-(s–1), as shown in FIG. 5. For clarity in FIG. 5, for example, the separate multiplier $b_{(s-1)}$ 12-(s–1) is in a same bitwise position, and is a same multiplier, as is the separate multiplier $b_{s\ 12}$-s in FIG. 2 before the method 100 of FIG. 4. In operation 114, the method 100 returns, e.g., to any calling function.

In some examples, such as if the initial structure of FIG. 3 is determined in operation 102, the compressed separate multiplier $b_s=\hat{b}$ 18-s of FIG. 3 can have a same or different compression as the compressed separate multiplier $b_s=\hat{b}$ 22-s of FIG. 5.

If, in operation 108, the compressed $\hat{b}$-bits is not greater than or equal to the compression floor f, the method 100 returns in operation 114. Under such circumstances, there are insufficient bits in the unusable bits e for a compressed separate multiplier to have the minimum compression. Hence, a compressed separate multiplier is not inserted in the structure, and the width s of the structure is not able to be increased.

Figure 6:
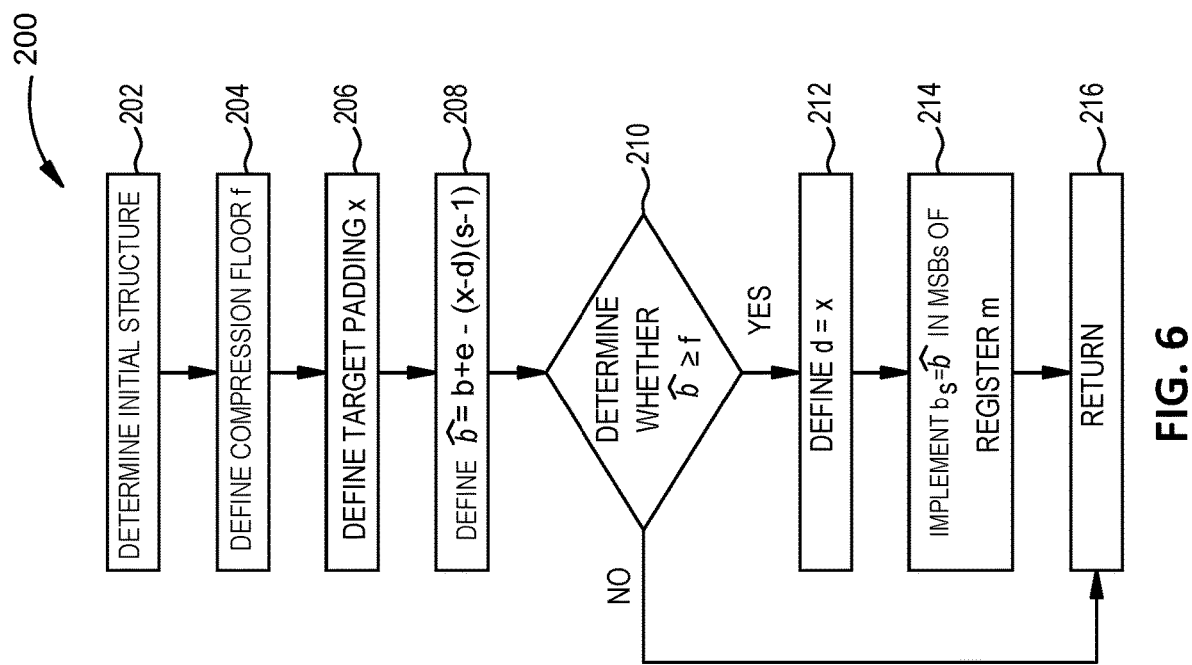
FIG. 6 is a method for increasing a cascade carry length by compressing a separate multiplier in the SIMD structure, according to some examples.
Figure 7:
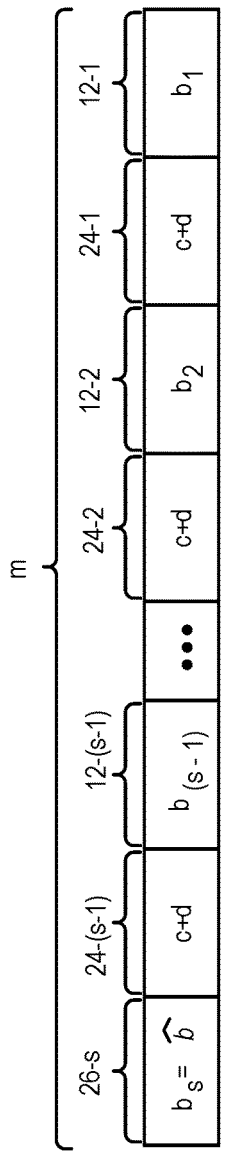
FIG. 7 is a generalized SIMD structure with an increased cascade carry length by including a compressed separate multiplier, according to some examples.

FIG. 6 is a method 200 for increasing a cascade carry length (e.g., increasing the padding d) by compressing the separate multiplier $b_s$ to a compressed separate multiplier $b_s=\hat{b}$ in the SIMD structure, according to some examples. FIG. 7 illustrates a generalized SIMD structure with an increased cascade carry length by including a compressed separate multiplier $b_s=\hat{b}$ as described with respect to FIG. 6, according to some examples. The method 200 of FIG. 6 permits determining a compression length of $\hat{b}$-bits for a compressed separate multiplier $b_s=\hat{b}$, which permits increasing the padding d of the SIMD structure without altering the width s.

In operation 202, an initial structure of the SIMD is determined, as described above with respect to operation 102 of FIG. 4. In operation 204, a compression floor f for a compressed separate multiplier is defined, as described above with respect to operation 104 of FIG. 4. In operation 206, a target padding x is defined. The target padding x is the amount of padding that can achieve the desired cascade carry length.

In operation 208, the compressed $\hat{b}$-bits is defined to equal the b-bits plus the unusable bits e minus the product of the difference between the target padding x and the padding d and the width s less one (e.g., $\hat{b}=b+e-(x-d)(s-1)$). Conceptually, to increase the padding d of the SIMD structure in this example, the unusable bits e are combined with the b-bits of the separate multiplier $b_s$ in the MSB of the register m, which is then decreased by the number of bits needed to increase the padding d to the target padding x. In this example, the target padding x is assumed to be greater than the padding d; a logic statement may be added to ensure this assumption is carried out in practice. The number of bits needed to increase the padding d to the target padding x is the difference between the target padding x and the padding d times the number of instances (e.g., (s–1) instances) of the padding d in the register m (e.g., (x–d)(s–1)). The bits removed from the combined unusable bits e and b-bits of the separate multiplier $b_s$ are distributed to the instances of the padding d to increase the padding d. By summing the b-bits of the separate multiplier $b_s$ in the MSB of the register m and the unusable bits e, conceptually, the unusable bits e are first consumed to increase the padding d before the b-bits of the separate multiplier $b_s$ in the MSB of the register m. By increasing the padding d, the cascade carry length l can be increased.

In operation 210, a determination is made whether the compressed $\hat{b}$-bits is greater than or equal to the compression floor f. If the compressed $\hat{b}$-bits is greater than or equal to the compression floor f, the padding d is defined as equal to the target padding x in operation 212. The increased padding d is implemented in the minimum spacing c plus padding d 24-1 through 24-(s–1) in FIG. 7. In operation 214, a compressed separate multiplier $b_s=\hat{b}$ (compressed separate multiplier $b_s=\hat{b}$ 26-s in FIG. 7) is implemented in the MSB of the register m. In operation 216, the method 200 returns, e.g., to any calling function.

If, in operation 210, the compressed $\hat{b}$-bits is not greater than or equal to the compression floor f, the method 200 returns in operation 216. Under such circumstances, there are not sufficient bits in the unusable bits e and the separate multiplier $b_s$ in the MSB of the register m that are available for a compressed separate multiplier to have the minimum compression to achieve the target padding x. Hence, the separate multiplier $b_s$ in the MSB of the register m is not compressed to a compressed separate multiplier, and the padding d of the structure is not able to be increased.

Figure 9:
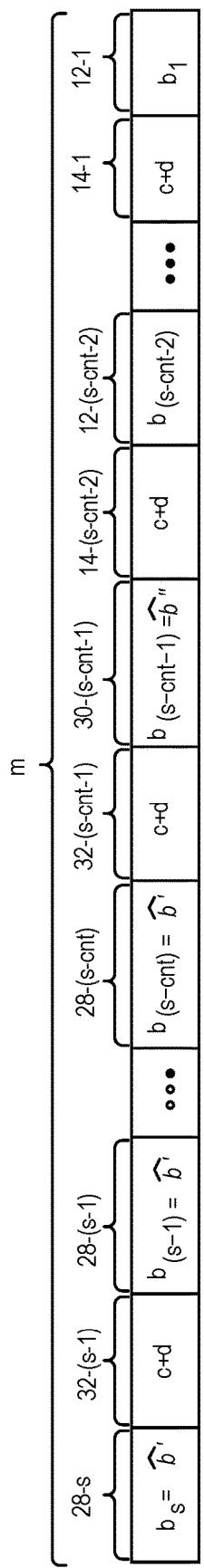
FIG. 9 is a generalized SIMD structure, which may be implemented with an increased width by including multiple compressed separate multipliers, according to some examples.
Figure 8:
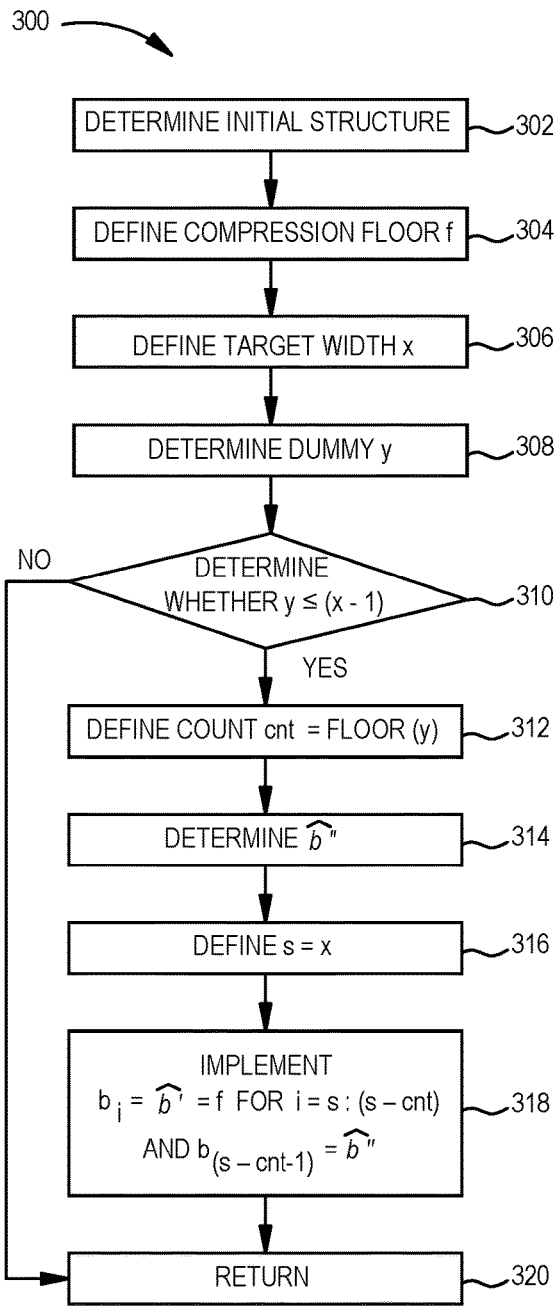
FIG. 8 is a method for increasing a SIMD width by including multiple compressed separate multipliers in the SIMD structure, according to some examples.

FIG. 8 is a method 300 for increasing a SIMD width by including multiple compressed separate multipliers in the SIMD structure, according to some examples. FIG. 9 illustrates a generalized SIMD structure, which may be implemented with an increased width by including multiple compressed separate multipliers as described with respect to FIG. 8, according to some examples. The method 300 of FIG. 8 attempts to define a first compression length of $\hat{b}'$-bits for compressed separate multipliers in MSB positions in the register m as a compression floor f, and to define a second compression length of $\hat{b}''$-bits for another compressed separate multiplier in a next LSB position in the register m. By defining the compressed separate multipliers in such a manner, the width s of the SIMD structure can be increased by the separate multipliers in MSB positions absorbing the compression.

In operation 302, an initial structure of the SIMD is determined, as described above with respect to operation 102 of FIG. 4. In operation 304, a compression floor f for a compressed separate multiplier is defined, as described above with respect to operation 104 of FIG. 4. In operation 306, a target width x is defined, which can permit a desired number of separate multipliers in the SIMD structure.

In operation 308, a dummy variable y is determined. The dummy variable y is generally the number of instances of the first compression length of $\hat{b}'$-bits in the SIMD structure. The SIMD structure with a width of the target width x is generally defined as shown in Equation (18) below:

$$m=\hat{b}'+(\hat{b}'+c+d)(y-1)+(b+c+d)(x-y) \qquad \text{Eq. (18).}$$

As stated above, $\hat{b}'$ is to be defined as the compression floor f, if compression to achieve the target width x is possible. Substituting for this value and solving for the dummy variable y results in Equation (19) below:

$$y = \frac{m - x(b + c + d) + c + d}{f - b}. \qquad \text{Eq. (19)}$$

In operation 310, a determination is made whether the dummy variable y is less than or equal to one less than the target width x. If the dummy variable y is greater than one less than the target width x, conceptually, more instances of the first compression length of $\hat{b}'$-bits in the SIMD than permitted and/or more compression than permitted by the compression floor f would be needed to increase the SIMD width. By comparing the dummy variable y to one less than the target width x, at least one uncompressed separate multiplier can remain in the SIMD.

If the dummy variable y is less than or equal to one less than the target width x, count cnt is defined as floor(y) in operation 312. The count cnt is the number of instances of the first compression length of $\hat{b}'$-bits in the SIMD structure. Since the dummy variable y may be a non-integer, the floor function is used to determine an integer to define the number of instances of the first compression length of $\hat{b}'$-bits in the SIMD structure. If a ceiling function is used instead of a floor function, the ceiling function might cause a too pessimistic compression in the separate multiplier in the LSB position of the register m that is compressed.

In operation 314, the second compression length of $\hat{b}''$-bits is determined. The floor function of operation 312 can cause some compression to achieve the target width x to be omitted. The second compression length of $\hat{b}''$-bits can accommodate this omission. The SIMD structure with a width of the target width x is generally defined as shown in Equation (20) below:

$$m=\hat{b}'+(\hat{b}'+c+d)(cnt-1)+(\hat{b}''+c+d)+(b+c+d)(x-cnt-1) \qquad \text{Eq. (20).}$$

As stated above, $\hat{b}'$ is to be defined as the compression floor f, if compression to achieve the target width x is possible. Substituting for this value and solving for $\hat{b}''$ results in Equation (21) below:

$$\hat{b}''=m-(c+d)(x-1)-f(cnt)-b(x-cnt-1) \qquad \text{Eq. (21).}$$

In operation 316, the width s is defined as the target width x. In operation 318, first compressed separate multipliers $b_i=\hat{b}'$ are defined as having $\hat{b}'$-bits for instances in the SIMD structure from s to (s−cnt) (illustrated in FIG. 9 as first compressed separate multipliers $b_i=\hat{b}'$ 28-i), and a second compressed separate multiplier $b_{(s-cnt-1)}=\hat{b}''$ is defined as having $\hat{b}''$-bits (illustrated in FIG. 9 as a second compressed separate multiplier $b_{(s-cnt-1)}=\hat{b}''$ 30-(s−cnt−1)). Although the minimum spacing c and padding d do not change in terms of number of bits, minimum spacing c and padding d may be inserted as a result of increasing the width s to include additional separate multipliers b, and previously existing minimum spacing c plus padding d may be shifted to less significant bit positions to accommodate the compression in one or more separate multipliers b in a less significant position in the register m. These inserted or shifted minimum spacing c plus padding d 32-(s−cnt−1) through 32-(s−1) are illustrated in FIG. 9. Referring back to FIG. 8, in operation 320, the method 300 returns, e.g., to any calling function.

Referring back to operation 310, if the dummy variable y is not less than or equal to one less than the target width x, then the separate multipliers cannot be compressed sufficiently to achieve the target width x, and the method 300 returns in operation 320 without modifying the SIMD structure.

Figure 11:
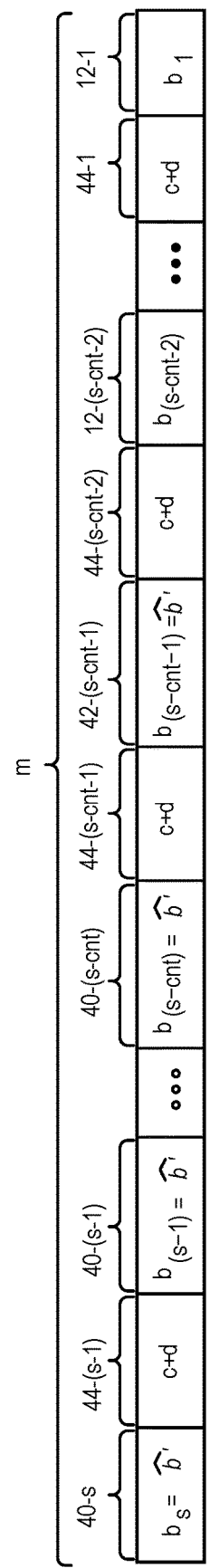
FIG. 11 is a generalized SIMD structure, which may be implemented with an increased padding by having multiple compressed separate multipliers, according to some examples.
Figure 10:
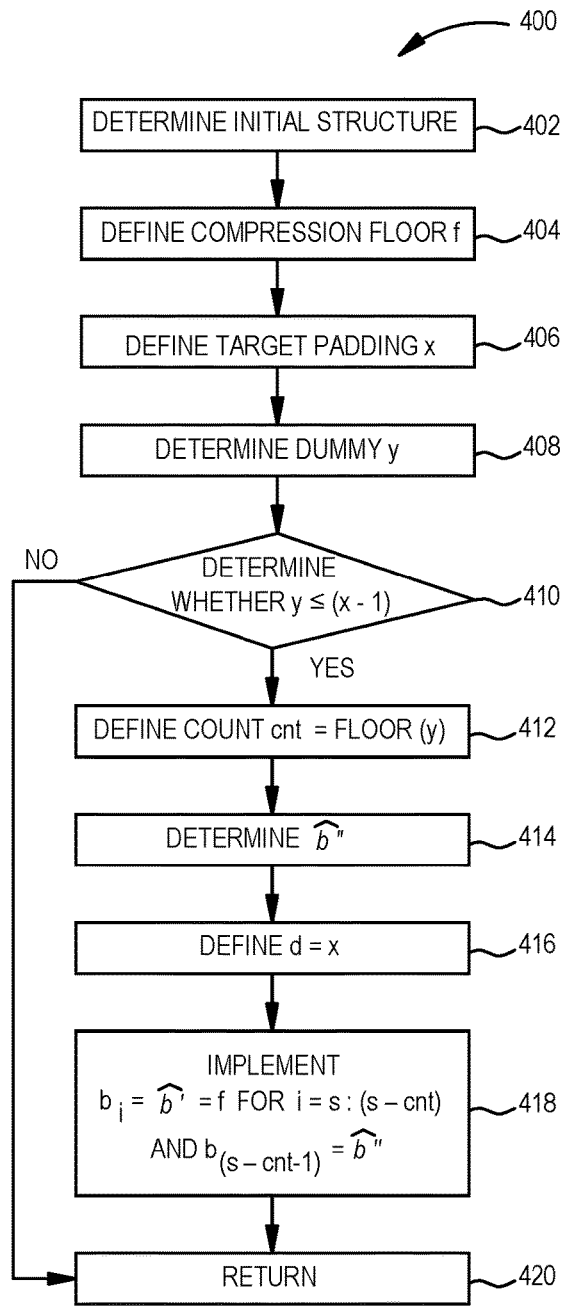
FIG. 10 is a method for increasing a cascade carry length by compressing multiple separate multipliers in the SIMD structure, according to some examples.

FIG. 10 is a method 400 for increasing a cascade carry length (e.g., increasing the padding d) by compressing multiple separate multipliers in the SIMD structure, according to some examples. FIG. 11 illustrates a generalized SIMD structure, which may be implemented with an increased padding by having multiple compressed separate multipliers as described with respect to FIG. 10, according to some examples. The method 400 of FIG. 10 attempts to define a first compression length of $\hat{b}'$-bits for compressed separate multipliers in MSB positions in the register m as a compression floor f, and to define a second compression length of $\hat{b}''$-bits for another compressed separate multiplier in a next MSB position in the register m. By defining the compressed separate multipliers in such a manner, the padding d of the SIMD structure can be increased by the separate multipliers in MSB positions absorbing the compression.

In operation 402, an initial structure of the SIMD is determined, as described above with respect to operation 102 of FIG. 4. In operation 404, a compression floor f for a compressed separate multiplier is defined, as described above with respect to operation 104 of FIG. 4. In operation 406, a target padding x is defined, which can permit a desired cascade carry chain length.

In operation 408, a dummy variable y is determined. The dummy variable y is generally the number of instances of the first compression length of $\hat{b}'$-bits in the SIMD structure. The SIMD structure with a width of the target padding x is generally defined as shown in Equation (22) below:

$$m=\hat{b}'+(\hat{b}'++x)(y-1)+(b+c+x)(s-y) \qquad \text{Eq. (22).}$$

As stated above, $\hat{b}'$ is to be defined as the compression floor f, if compression to achieve the target padding x is possible. Substituting for this value and solving for the dummy variable y results in Equation (23) below:

$$y = \frac{m - s(b + c + x) + c + x}{f - b}. \qquad \text{Eq. (23)}$$

In operation 410, a determination is made whether the dummy variable y is less than or equal to one less than the target padding x. If the dummy variable y is greater than one less than the target padding x, conceptually, more instances of the first compression length of $\hat{b}'$-bits in the SIMD than permitted and/or more compression than permitted by the compression floor f would be needed to increase padding. By comparing the dummy variable y to one less than the target width x, at least one uncompressed separate multiplier can remain in the SIMD structure.

If the dummy variable y is less than or equal to one less than the target padding x, count cnt is defined as floor(y) in operation 412. The count cnt is the number of instances of the first compression length of $\hat{b}'$-bits in the SIMD structure. Since the dummy variable y may be a non-integer, the floor function is used to determine an integer to define the number of instances of the first compression length of $\hat{b}'$-bits in the SIMD structure. If a ceiling function is used instead of a floor function, the ceiling function might cause a too pessimistic compression in the separate multiplier in the LSB position of the register m that is compressed.

In operation 414, the second compression length of $\hat{b}''$-bits is determined. The floor function of operation 412 can cause some compression to achieve the target padding x to be omitted. The second compression length of $\hat{b}''$-bits can accommodate this omission. The SIMD structure with a padding of the target padding x is generally defined as shown in Equation (24) below:

$$m=\hat{b}'+(\hat{b}'++x)(cnt-1)+(\hat{b}''+c+x)+(b+c+x)(s-cnt-1) \qquad \text{Eq. (24).}$$

As stated above, $\hat{b}'$ is to be defined as the compression floor f, if compression to achieve the target padding x is possible. Substituting for this value and solving for $\hat{b}''$ results in Equation (25) below:

$$\hat{b}''=m-(c+x)(s-1)-f(cnt)-b(s-cnt-1) \qquad \text{Eq. (25).}$$

In operation 416, the padding d is defined equal to the target padding x. In operation 418, first compressed separate multipliers $b_i=\hat{b}'$ are defined as having $\hat{b}'$-bits for instances in the SIMD structure from s to (s−cnt) (illustrated in FIG. 11 as first compressed separate multipliers $b_i=\hat{b}'$ 40-$i$), and a second compressed separate multiplier $b_{(s-cnt-1)}=\hat{b}''$ is defined as having $\hat{b}''$-bits (illustrated in FIG. 11 as a second compressed separate multiplier $b_{(s-cnt-1)}=\hat{b}''$ 42-(s−cnt−1)). With the increase in padding d and with compression of separate multipliers b, various separate multipliers b and minimum spacing c plus padding d may shift in the register m. Uncompressed separate multipliers b in more significant positions in the register m than the separate multiplier $b_1$ can be left shifted due to the increase in bits in the padding d. Although the designation of uncompressed separate multipliers b in FIG. 11 is not changed from FIG. 2, as an example, shifts to these uncompressed separate multipliers b may occur. Any shift for compressed separate multipliers b can be to accommodate the increase in bits of padding d and/or the decrease in bits of compressed separate multipliers b. Minimum spacing c plus increased padding d 44-(s−1) through 44-1 are illustrated in FIG. 11. Referring back to FIG. 10, in operation 420, the method 400 returns, e.g., to any calling function.

Referring back to operation 410, if the dummy variable y is not less than or equal to one less than the target padding x, then the separate multipliers cannot be compressed sufficiently to achieve the target padding x, and the method 400 returns in operation 420 without modifying the SIMD structure.

Figure 12:
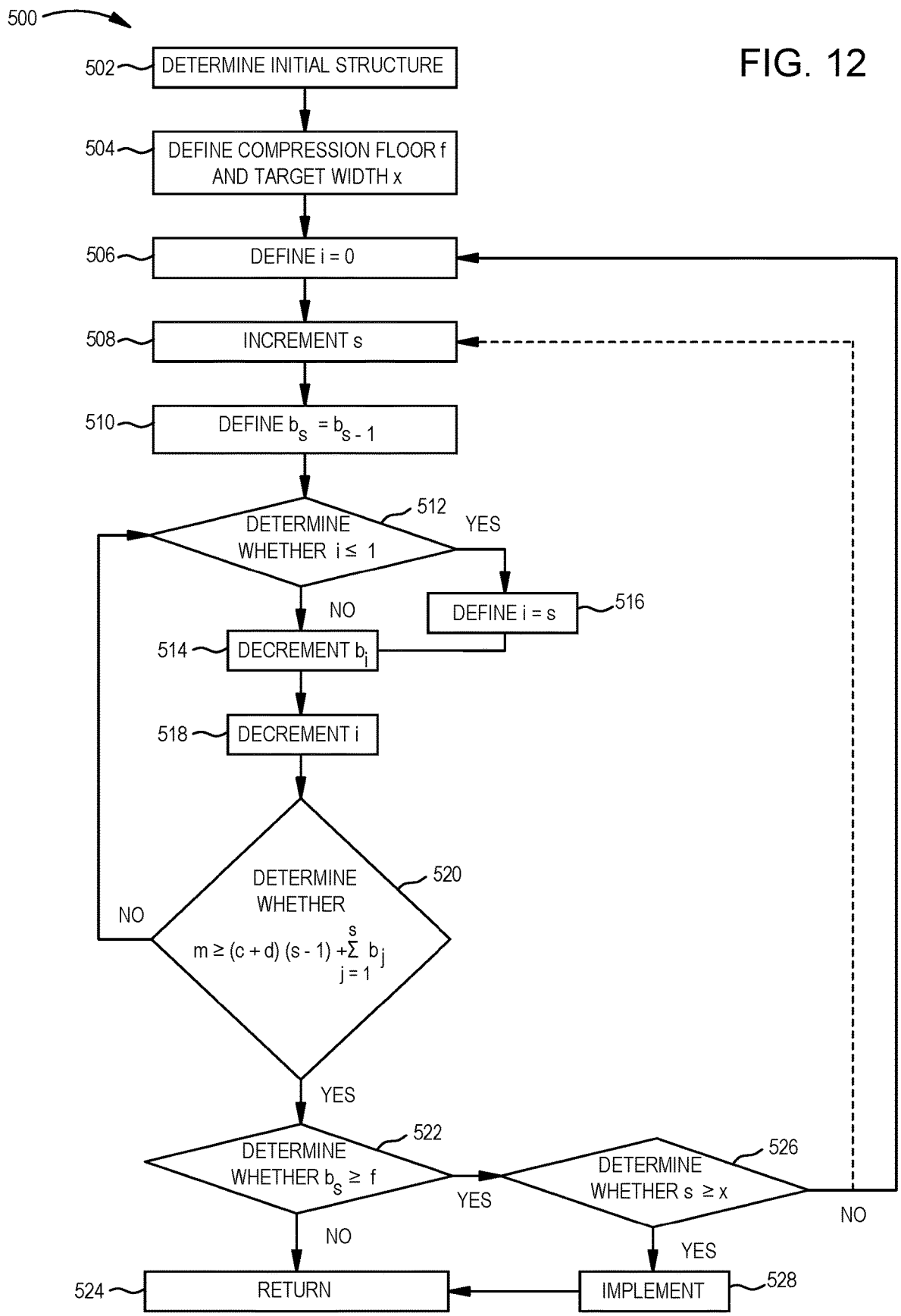
FIG. 12 is a method for increasing a SIMD width by including multiple compressed separate multipliers in the SIMD structure, according to some examples.

FIG. 12 is a method 500 for increasing a SIMD width by including multiple compressed separate multipliers in the SIMD structure, according to some examples. The method 500 of FIG. 12 attempts to distribute compression beginning at a separate multiplier in a MSB position in the register m through separate multipliers in less significant positions in the register m, without compressing the separate multiplier in the LSB position in the register m. By defining the compressed separate multipliers in such a manner, the width s of the SIMD structure can be increased. The method 500 attempts to iteratively solve for a solution to implement an SIMD structure having a target width.

In operation 502, an initial structure of the SIMD is determined, as described above with respect to operation 102 of FIG. 4. In operation 504, a compression floor f for a compressed separate multiplier is defined, as described above with respect to operation 104 of FIG. 4, and further, a target width x is defined.

In operation 506, a loop counter i is defined and initiated to zero, and in operation 508, the width s is incremented. In operation 510, b-bits of a separate multiplier $b_s$ is defined equal to b-bits of the separate multiplier $b_{(s-1)}$. The separate multiplier $b_{(s-1)}$ was the separate multiplier $b_s$ in the MSB position in the SIMD structure as determined in operation 502 or by a previous iteration of other operations of the loop before the width s was incremented in operation 508. Further, as will become apparent in operation of the loop, minimum spacing c and padding d are accounted for insertion between the separate multipliers $b_{(s-1)}$ and $b_s$.

In operation 512, a determination is made whether the loop counter i is less than or equal to one. If not, in operation 514, the number of $b_i$-bits of separate multiplier $b_i$ is decremented. Referring back to operation 512, if the loop counter i is less than or equal to one, the loop counter i is defined as the width s in operation 516. From operation 516, the method 500 proceeds to operation 514. After operation 514, the loop counter i is decremented in operation 518. In operation 520, a determination is made whether m-bits of the register m is greater than or equal to the sum of the various instances of the respective bits of separate multipliers (compressed and uncompressed) and minimum spacing c plus padding d in the register m (e.g., $m \geq (c+d)(s-1)+\Sigma_{j=1}^{s} b_j$). If not, the method 500 loops to operation 512.

Conceptually, operations 506 through 520 attempt to append a separate multiplier b and minimum spacing c plus padding d to the initial structure determined in operation 502 or as modified by previous iterations of various loops to increase the width s. With the appended separate multiplier b and minimum spacing c plus padding d, the loop attempts to iteratively decrement the separate multipliers b until the sum of the bits of all instances of the separate multipliers b (compressed and uncompressed) and minimum spacing c plus padding d is less than the m-bits of the register m. If this sum can be reduced to be equal to or less than the m-bits, the width s is able to be incremented, subject to a subsequent determination that the compression is not below the compression floor f.

While attempting to increase the width s by one, the loop of operations 512 through 520 can serially and repeatedly decrement $b_i$-bits from position s (e.g., the MSB position of a separate multiplier b) through position 2, when thereafter the loop restarts at position s. The $b_1$-bits of separate multiplier $b_1$ are not compressed. The determination of operation 512 can prevent the $b_1$-bits of separate multiplier $b_1$ from being compressed by causing the method 500 to be directed to operation 516, which resets the loop counter i to the width s to cause the $b_s$-bits of the separate multiplier $b_s$ to be decremented in the subsequent operation 514.

Referring back to operation 520, if the sum is less than or equal to the m-bits of the register m, a determination is made, in operation 522, whether the $b_s$-bits of the compressed separate multiplier $b_s$ in the MSB position of the register m is greater than or equal to the compression floor f. Due to the order of the decrementing of separate multipliers b by the loop, the separate multiplier $b_s$ in the MSB of the register m can have the most compression of all of the separate multipliers b, although other separate multipliers b can have a same compression. If the $b_s$-bits of the compressed separate multiplier $b_s$ is not greater than or equal to the compression floor f, the method 500, in operation 524, returns, e.g., to any calling function, with the initial structure determined in operation 502 without implementing any modification to that initial structure.

Referring back to operation 522, if the $b_s$-bits of the compressed separate multiplier $b_s$ is greater than or equal to the compression floor f, a determination is made, in operation 526, whether the width s is greater than or equal to the target width x. If the width s is greater than or equal to the target width x, in operation 528, the width s and the compressed separate multipliers $b_i$ are implemented to modify the initial structure determined in operation 502. Minimum spacing c plus padding d are inserted as appropriate. Then, the method 500, in operation 524, returns, e.g., to any calling function.

Referring back to operation 526, if the width s is not greater than or equal to the target width x, the method 500 loops back to operation 506 or operation 508. By looping back to operation 506 or 508, the method 500 attempts to increment the width s and determine corresponding compression. This loop can continue until the target width x is achieved or the separate multipliers cannot be sufficiently compressed (e.g., due to the compression floor f) to achieve the target width x.

If the method 500 loops back to operation 506, the loop counter i is reset to zero each iteration of the loop. Hence, each subsequent iteration of the loop begins compression at the separate multiplier $b_s$ in the MSB of the register m. Accordingly, when the method 500 returns in operation 524, the compression of the different compressed separate multipliers b can vary throughout the register m. Generally, the compression will be greatest at the separate multiplier $b_s$ in the MSB of the register m and may decrease at less significant positions in the register m.

If the method 500 loops back to operation 508, the loop counter i is not reset at each iteration of the loop. Hence, each subsequent iteration of the loop begins compression at the separate multiplier b immediately following the separate multiplier b that the previous iteration of the loop last decremented. This looping can cause round robin compression. Accordingly, when the method 500 returns in operation 524, the compression of the different compressed separate multipliers b can be at one level or one of two different compression levels.

Figure 13:
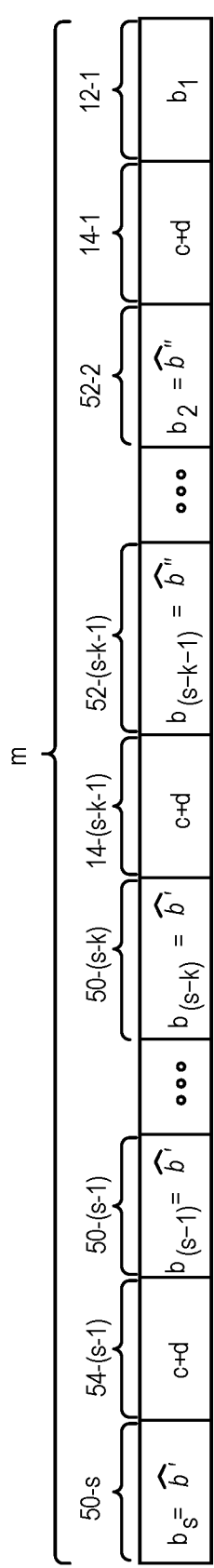
FIG. 13 is a generalized SIMD structure, which may be implemented with an increased width by including multiple compressed separate multipliers, according to some examples.

FIG. 13 illustrates a generalized SIMD structure, which may be implemented with an increased width by including multiple compressed separate multipliers as described with respect to FIG. 12, according to some examples. The SIMD structure of FIG. 13 illustrates a generalized result of round robin compression (e.g., looping back to operation 508 in the method 500). A person having ordinary skill in the art will readily understand how an SIMD structure may be implemented as a result of looping back to operation 506 in the method 500.

The round robin compression generally can result in one or two compression levels. As illustrated with two compression levels, a first compression $\hat{b}'$-bits and a second compression $\hat{b}''$-bits are generated by the round robin compression. The second compression $\hat{b}''$-bits are each one bit more than the first compression $\hat{b}'$-bits. Hence, the compression of the first compression $\hat{b}'$-bits is greater than the compression of the second compression $\hat{b}''$-bits.

FIG. 13 illustrates first compressed separate multipliers $b=\hat{b}'$ 50-s through 50-(s−k), where k is an arbitrary integer from the width s to 2. The value of k will generally be the value of the loop counter i plus one when the method 500 returns in operation 524. Similarly, FIG. 13 illustrates second compressed separate multipliers $b=\hat{b}''$ 52-(s−k−1) through 52-2. FIG. 13 further illustrates uncompressed separate multiplier $b_1$ 12-1. Some number of minimum spacing c plus padding d (e.g., minimum spacing c plus padding d 54-(s−1)) are between various neighboring pairs of compressed separate multipliers b where at least one of those compressed separate multipliers b was added by the increase in width s. Minimum spacing c plus padding d (e.g., minimum spacing c plus padding d 14-1 and 14-(s−k−1)) that was previously in the initial SIMD structure remains, albeit possibly with some shifting due to compression of separate multipliers in less significant positions.

Figure 14:
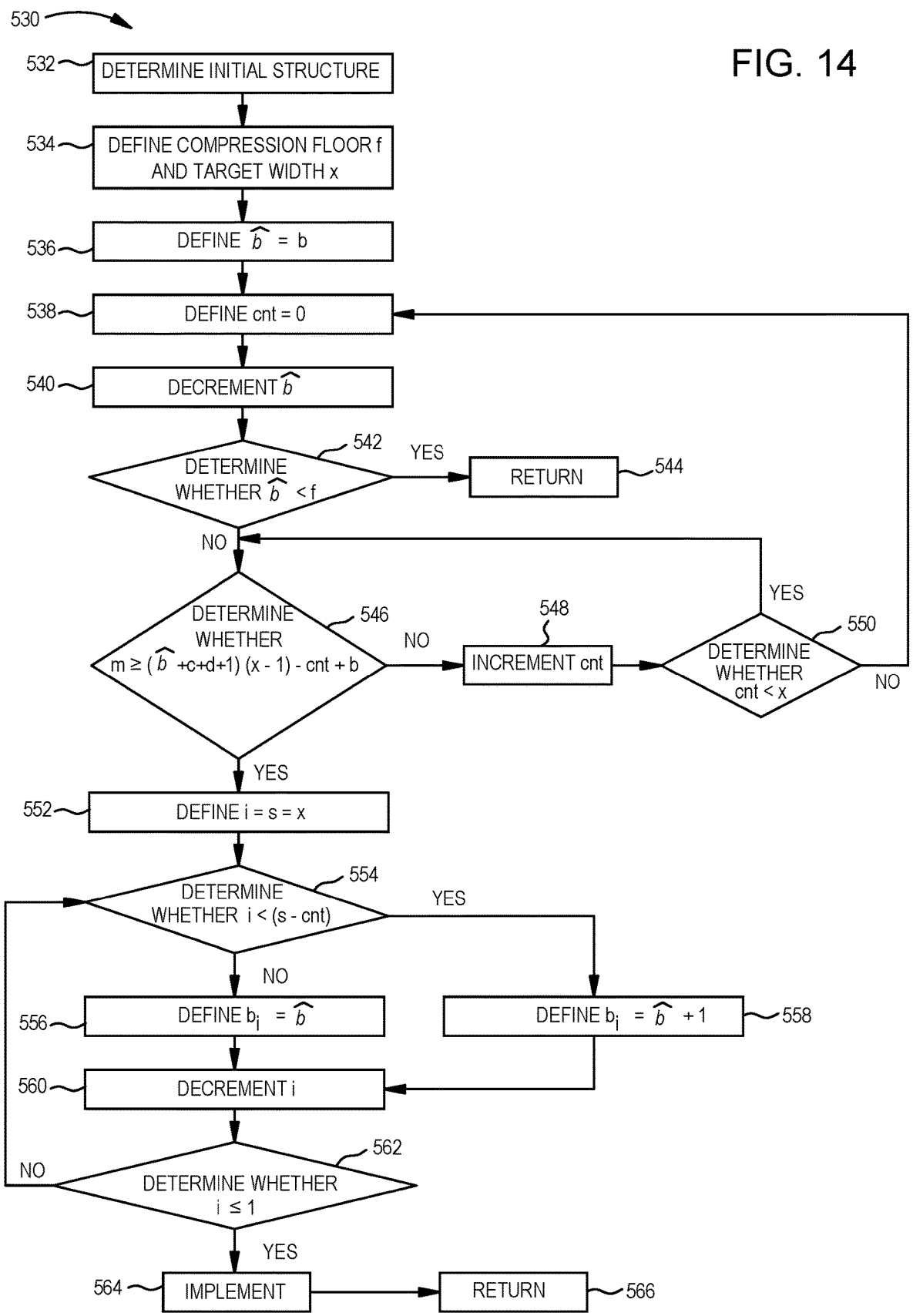
FIG. 14 is a method for increasing a SIMD width by including multiple compressed separate multipliers in the SIMD structure, according to some examples.

FIG. 14 is a method 530 for increasing a SIMD width by including multiple compressed separate multipliers in the SIMD structure, according to some examples. The method 530 of FIG. 14, like FIG. 12, attempts to distribute compression beginning at a separate multiplier in a MSB position in the register m through separate multipliers in less significant position in the register m, without compressing the separate multiplier in the LSB position in the register m. By defining the compressed separate multipliers in such a manner, the width s of the SIMD structure can be increased. The method 530 attempts to numerically identify a solution to implement an SIMD structure having a target width.

In operation 532, an initial structure of the SIMD is determined. In operation 534, a compression floor f for a compressed separate multiplier and a target width x are defined. In operation 536, a compression variable $\hat{b}$ is defined equal to the b-bits of the separate multipliers b initially determined in operation 532. In operation 538, a count cnt is defined and initiated to zero.

In operation 540, the compression variable b is decremented. In operation 542, a determination is made whether the compression variable $\hat{b}$ is less than the compression floor f. If the compression variable $\hat{b}$ is less than the compression floor f, then in operation 544, the method 530 returns, e.g., to any calling function, without modifying the SIMD structure.

If the compression variable $\hat{b}$ is not less than the compression floor f, then in operation 546, a determination is made whether the m-bits is greater than or equal to the sum of the compression variable $\hat{b}$, minimum spacing c, padding d, and one times one less than the target width x, and minus the count cnt plus the b-bits (e.g, $m \geq (\hat{b}+c+d+1)(x-1)-cnt+b$). If not, then, in operation 548, the count cnt is incremented, and in operation 550, a determination is made whether the count cnt is less than the target width x. If the count cnt is less than the target width x, the method 530 loops to operation 546, and if the count cnt is not less than the target width x, the method 530 loops to operation 538.

Conceptually, the loops of operations 536 through 550 attempt to define an SIMD structure having the target width x and to solve for a minimal compression that can achieve that SIMD structure. The SIMD structure in this example is assumed to be the structure described with respect to the round robin example of FIGS. 12 and 13 above. Under that assumption, there may be two levels of compression, where one level of compression is one bit more than the other level.

Further, the separate multiplier $b_1$ in the LSB position of the register m is to remain uncompressed. Hence, in the register m, there are one uncompressed separate multiplier $b_1$, count cnt number of compressed separate multipliers b with $\hat{b}$-bits, and the remaining compressed separate multipliers b with ($\hat{b}$+1)-bits. Mathematically, this is illustrated as Equation (26) as follows:

$$m=\hat{b}+(\hat{b}+c+d)(cnt-1)+((\hat{b}+1)+c+d)(x-cnt-1)+(b+c+d) \quad \text{Eq. (26)}.$$

Equation (26) is the basis for the determination of operation 546, since grouping like terms simplifies Equation (26) to Equation (27) below, which is reflected by operation 546:

$$m=(\hat{b}+c+d+1)(x-1)-cnt+b \quad \text{Eq. (27)}$$

With a minimal compression obtained by operation 540 by the compression variable b, the loop formed by operations 546, 548, and 550 attempts to identify a count cnt that is capable of achieving a SIMD structure with the target width x. The count cnt can determine the number of instances of the compressed separate multipliers b=$\hat{b}$, where the remaining separate multipliers are compressed separate multipliers b=($\hat{b}$+1), except the separate multiplier $b_1$ in the LSB of the register m. Once the possible number of instances of separate multipliers b available for compression has been exhausted (e.g., by the count cnt exceeding one less than the target width x), the count cnt is reset by operation 538, and the next minimal compression is obtained by operation 540. Then, the loop formed by operations 546, 548, and 550 again attempts to identify a count cnt that is capable of achieving a SIMD structure with the target width x. These loops continue until a compression variable $\hat{b}$ and count cnt that achieves the target width x is identified in operation 546 or until the compression variable $\hat{b}$ is below the compression floor f as determined in operation 542.

If a solution is obtained by these loops, the subsequent operations set the appropriate separate multipliers b to have the appropriate compression. In operation 552, a loop counter i and the width s are defined equal to the target width x. In operation 554, a determination is made whether the loop counter i is less than the width s minus the count cnt. If the loop counter i is not less than the width s minus the count cnt, in operation 556, the separate multiplier $b_i$ is defined to be $\hat{b}$-bits, and if the loop counter i is less than the width s minus the count cnt, in operation 558, the separate multiplier $b_i$ is defined to be ($\hat{b}$+1)-bits. After operations 556 and 558, the loop counter i is decremented in operation 560, and in operation 562, a determination is made whether the loop counter i is less than or equal to 1. If the loop counter i is not less than or equal to 1, the method 530 loops back to operation 554. If the loop counter i is less than or equal to 1, the width s and compressed separate multipliers b are implemented in operation 564, and in operation 566, the method 530 returns, e.g., to any calling function.

Figure 15:
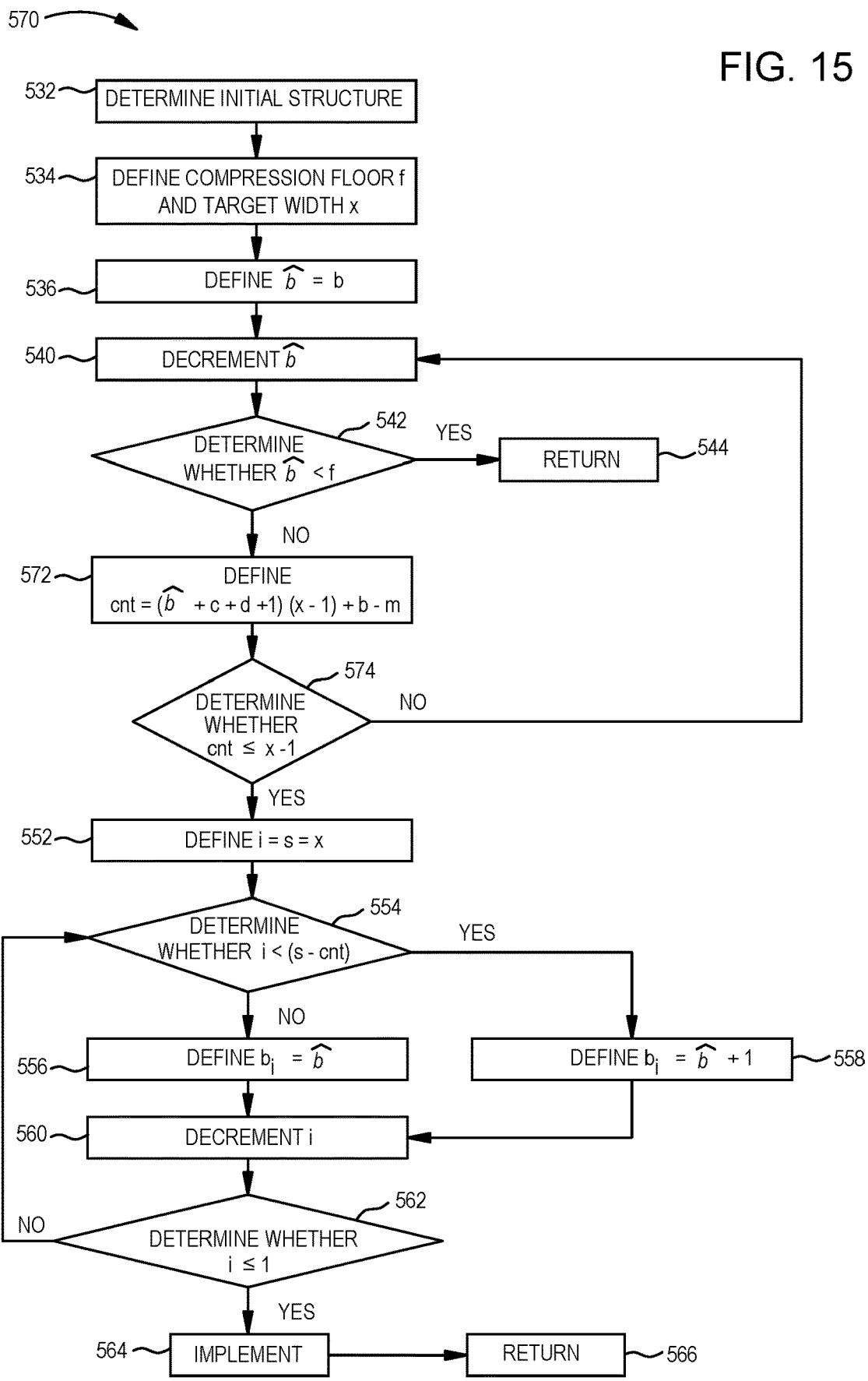
FIG. 15 is a method for increasing a SIMD width by including multiple compressed separate multipliers in the SIMD structure, according to some examples.

FIG. 15 is a method 570 for increasing a SIMD width by including multiple compressed separate multipliers in the SIMD structure, according to some examples. The method 570 of FIG. 15, like FIGS. 12 and 14, attempts to distribute compression beginning at a separate multiplier in a MSB position in the register m through separate multipliers in less significant position in the register m, without compressing the separate multiplier in the LSB position in the register m. By defining the compressed separate multipliers in such a manner, the width s of the SIMD structure can be increased. The method 570 attempt to numerically identify a compression amount while analytically determining a number of instances for compression levels to determine a solution to implement an SIMD structure having a target width. The method 570 of FIG. 15 is similar to the method 530 of FIG. 14, and hence, differences are described.

In the method 570 of FIG. 15, count cnt is analytically determined rather than numerically determined as in the method 530 of FIG. 14. Hence, the initialization and incrementing of the count cnt in operations 538 and 548 are omitted in the method 570 of FIG. 15.

The compression variable b is decremented in operation 540, and the determination whether the compression variable b is less than the compression floor f is made in operation 542. If the compression variable b is less than the compression floor f, the method 570 returns in operation 544. If the compression variable b is not less than the compression floor f, the count cnt is defined by solving Equation (27) above for count cnt, as shown by Equation (28) below:

$$cnt=(\hat{b}+c+d+1)(x-1)+b-m \quad \text{Eq. (28)}.$$

In operation 574, a determination is made whether the count cnt is less than or equal to one less than the target width x. If the count cnt is less than or equal to one less than the target width x, then there are sufficient instances of the separate multipliers b available to be compressed, and a solution has be determined. Hence, the method 570 proceeds to operation 552 and subsequent operations. If the count cnt is not less than or equal to one less than the target width x, then there are insufficient instances of the separate multipliers b available to be compressed. The method 570 then loops back to operation 540 to compress the compression variable b a minimal amount. This loop continues until a compression variable b and count cnt that achieves the target width x is identified in operation 574 or until the compression variable b is below the compression floor f as determined in operation 542.

The generalized SIMD structure of FIG. 13 can be achieved by the methods 530 and 570 of FIGS. 14 and 15, and hence, further description of a SIMD structure achieved by the methods 530 and 570 of FIGS. 14 and 15 is omitted.

Figure 16:
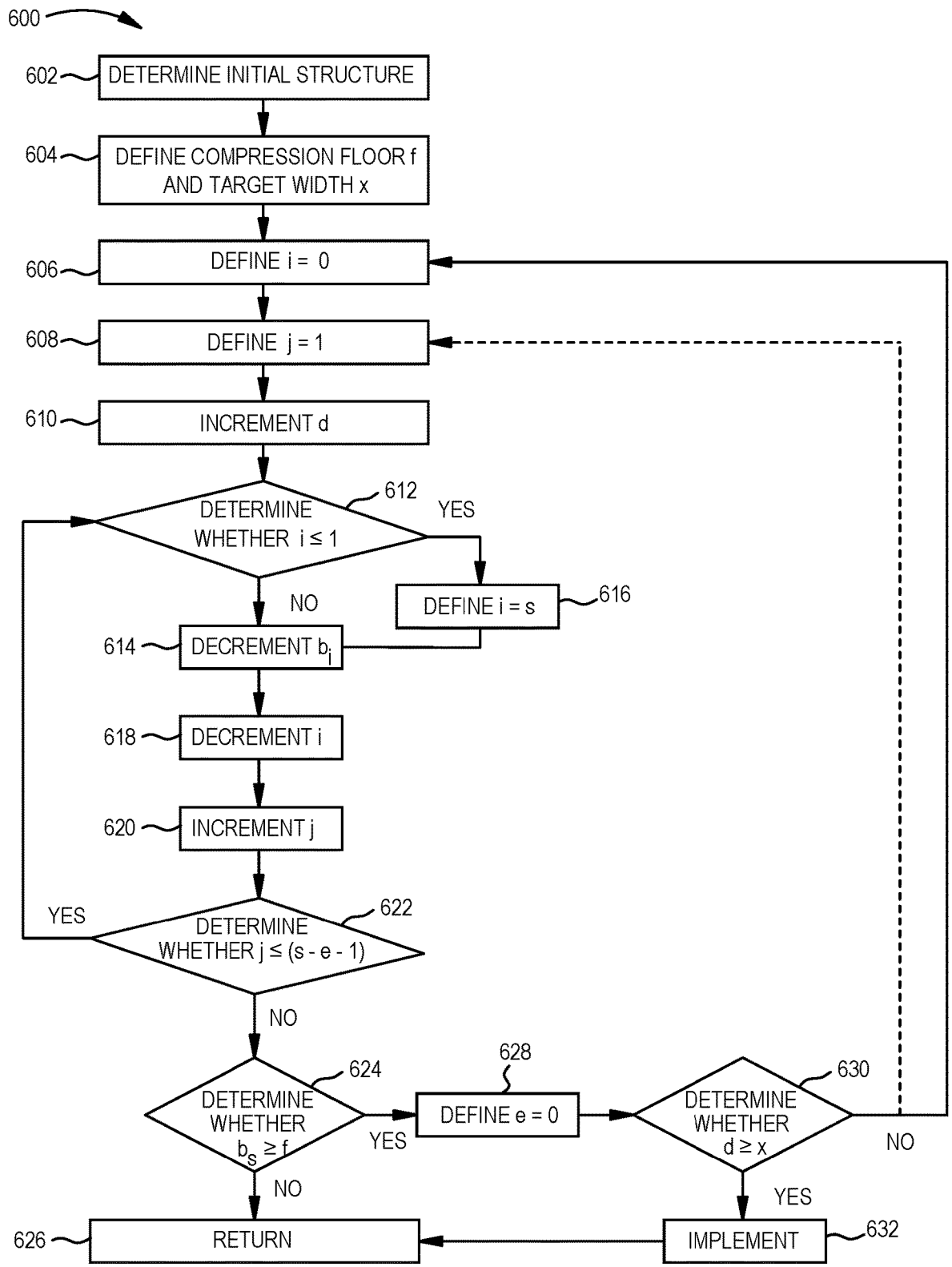
FIG. 16 is a method for increasing a cascade carry length by compressing multiple separate multipliers in the SIMD structure, according to some examples.

FIG. 16 is a method 600 for increasing a cascade carry length (e.g., increasing the padding d) by compressing multiple separate multipliers in the SIMD structure, according to some examples. The method 600 of FIG. 16 attempts to distribute compression beginning at a separate multiplier in a MSB position in the register m through separate multipliers in less significant positions in the register m, without compressing the separate multiplier in the LSB position in the register m. By defining the compressed separate multipliers in such a manner, the cascade carry length (e.g., padding d) of the SIMD structure can be increased.

In operation 602, an initial structure of the SIMD is determined. In operation 604, a compression floor f for a compressed separate multiplier and a target padding x are defined. In operation 606, a first loop counter i is defined and initialized to zero, and in operation 608, a second loop counter j is defined and initialized to one. In operation 610, the padding d is incremented.

In operation 612, a determination is made whether the first loop counter i is less than or equal to one. If not, in operation 614, the number of $b_i$-bits of separate multiplier $b_i$ is decremented. Referring back to operation 612, if the first loop counter i is less than or equal to one, the first loop counter i is defined as the width s in operation 616. From operation 616, the method 600 proceeds to operation 614. After operation 614, the first loop counter i is decremented in operation 618, and the second loop counter j is incremented in operation 620. In operation 622, a determination is made whether the second loop counter j is less than or equal to the difference between the width s and the unusable bits e less one (e.g., j≤(s−e−1). If the second loop counter j is less than or equal to the difference between the width s and the unusable bits e less one, the method 600 loops to operation 612.

Conceptually, operations 606 through 622 attempt to increment the padding d of the initial structure determined in operation 602 or a structure determined by a previous iteration of the loop by serially decrementing bits of a separate multiplier b until enough bits have been decremented to increase the padding d by one. To increment the padding d by one, (s−1) number of bits generally needs to be available for distribution in each instance of an appended minimum spacing c plus the padding d in the register m. The number of bits that are to be made available by the compression then is at least (s−1) less the unusable bits e. One bit can become available by compressing any separate multiplier b of the register m. Hence, the padding d can be incremented by one by decrementing (s−e−1) instances of separate multipliers b, subject to a subsequent determination that the compression is not below the compression floor f.

While attempting to increase the padding d, the loop of operations 612 through 622 can serially decrement $b_i$ from position s (e.g., the MSB position in the register m) through position 2. The b-bits of separate multiplier $b_1$ in the LSB of the register m are not compressed. The determination of operation 612 can prevent the $b_1$-bits of separate multiplier $b_1$ from being compressed by causing the method 600 to be directed to operation 616, which resets the first loop counter i to the width s to cause $b_s$-bits of the separate multiplier $b_s$ to be decremented in the subsequent operation 614.

Referring back to operation 622, if the second loop counter j is not less than or equal to the difference between the width s and the unusable bits e less one, a determination is made, in operation 624, whether the $b_s$-bits of the compressed separate multiplier $b_s$ in the MSB of the register m is greater than or equal to the compression floor f. Due to the order of the decrementing of separate multipliers b by the loop, the separate multiplier $b_s$ in the MSB of the register m can have the most compression of all of the separate multipliers b, although other separate multipliers b can have a same compression. If not, the method 600, in operation 626, returns, e.g., to any calling function, with the initial structure determined in operation 602 without implementing any modification to that initial structure.

Referring back to operation 624, if the $b_s$-bits of the compressed separate multiplier $b_s$ in the MSB of the register m is greater than or equal to the compression floor f, unusable bits e is defined to be equal to zero in operation 628. The unusable bits e are consumed in the initial incrementing of the padding d, and hence, thereafter, no unusable bits e are available. In operation 630, a determination is made whether the padding d is greater than or equal to the target padding x. If the padding d is greater than or equal to the target padding x, in operation 632, the padding d and the compressed separate multipliers $b_i$ are implemented to modify the initial structure determined in operation 602. Then, the method 600, in operation 626, returns, e.g., to any calling function.

Referring back to operation 630, if the padding d is not greater than or equal to the target padding x, the method 600 loops back to operation 606 or operation 608. By looping back to operation 606 or 608, the method 600 attempts to further increment the padding d and determine corresponding compression. This loop can continue until the target padding x is achieved or the separate multipliers cannot be sufficiently compressed (e.g., due to the compression floor f) to achieve the target padding x.

If the method 600 loops back to operation 606, the first loop counter i is reset to zero each iteration of the loop. Hence, each subsequent iteration of the loop begins compression at the separate multiplier $b_s$ in the MSB of the register m.

If the method 600 loops back to operation 608, the first loop counter i is not reset at each iteration of the loop. Hence, each subsequent iteration of the loop begins compression at the separate multiplier b immediately following the separate multiplier b that the previous iteration of the loop last decremented. This looping can cause round robin compression. Accordingly, when the method 600 returns in operation 628, the compression of the different compressed separate multipliers b can be at one level or one of two different compression levels.

Figure 17:
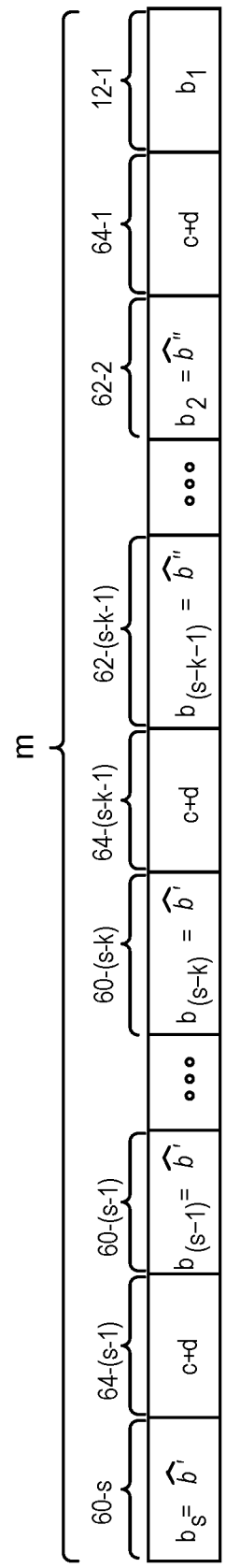
FIG. 17 is a generalized SIMD structure, which may be implemented with an increased padding by including multiple compressed separate multipliers, according to some examples.

FIG. 17 illustrates a generalized SIMD structure, which may be implemented with an increased padding d by including multiple compressed separate multipliers as described with respect to FIG. 16, according to some examples. The SIMD structure of FIG. 17 illustrates a generalized result of round robin compression (e.g., looping back to operation 608 in the method 600). A person having ordinary skill in the art will readily understand how an SIMD structure may be implemented as a result of looping back to operation 606 in the method 600.

The round robin compression generally can result in one or two compression levels. As illustrated with two compression levels, a first compression $\hat{b}'$-bits and a second compression $\hat{b}''$-bits are generated by the round robin compression. The second compression $\hat{b}''$-bits are each one bit more than the first compression $\hat{b}'$-bits. Hence, the compression of the first compression $\hat{b}'$-bits is greater than the compression of the second compression $\hat{b}''$-bits.

FIG. 17 illustrates first compressed separate multipliers $b=\hat{b}'$ 60-s through 60-(s−k), where k is an arbitrary integer from the width s to 2. The value of k will generally be the value of the first loop counter i plus one when the method 600 returns in operation 626. Similarly, FIG. 17 illustrates second compressed separate multipliers $b=\hat{b}''$ 62-(s−k−1) through 62-2. FIG. 17 further illustrates uncompressed separate multiplier $b_1$ 12-1. Minimum spacing c plus the increased padding d 64-(s−1) through 64-1 are between various neighboring pairs of separate multipliers b (compressed or uncompressed). Minimum spacing c plus padding d 64-(s−1) through 64-1 may be shifted relative to the initial SIMD structure due to compression of separate multipliers and/or the increased padding d in less significant positions.

Figure 18:
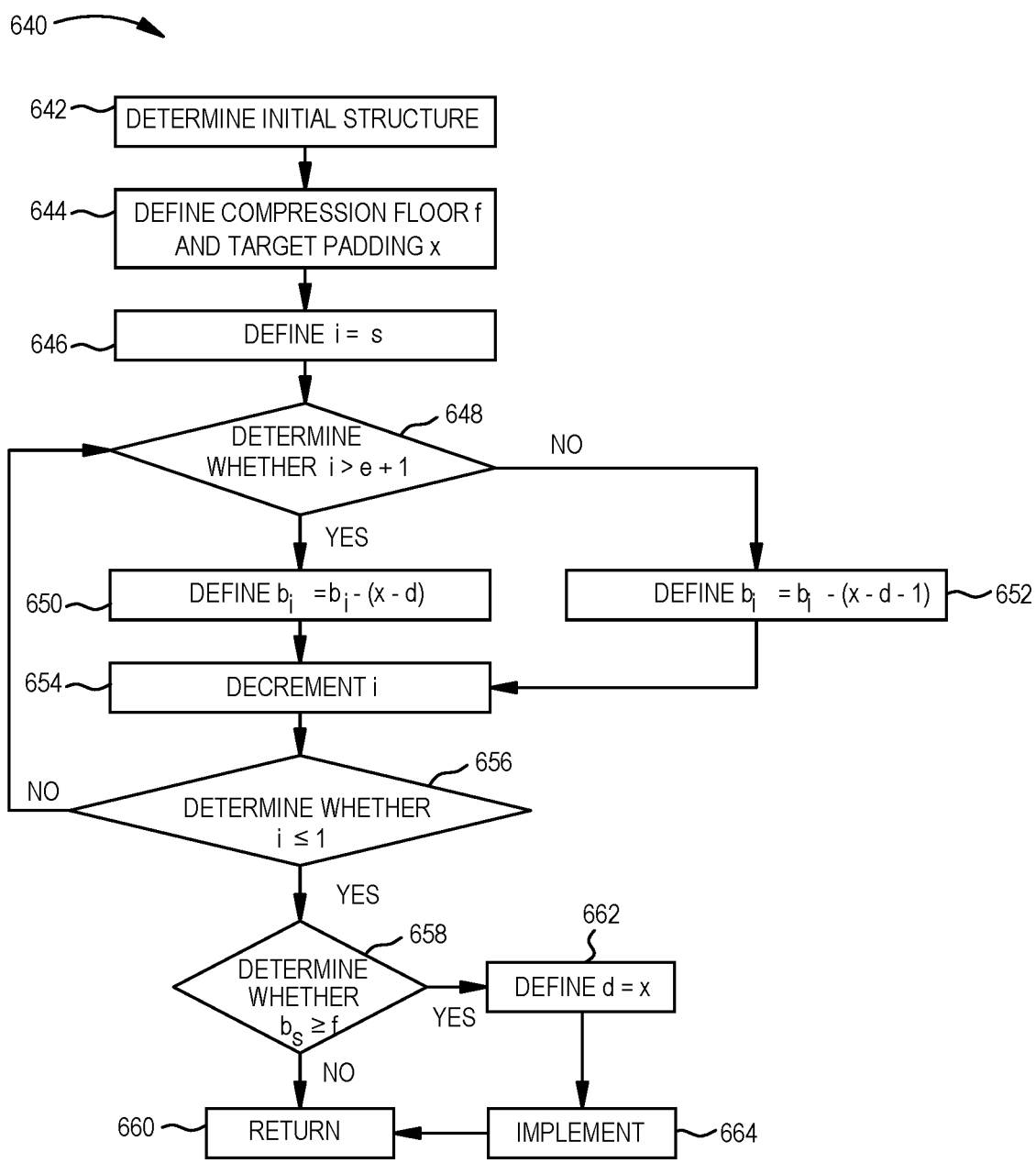
FIG. 18 is a method for increasing a cascade carry length by compressing multiple separate multipliers in the SIMD structure, according to some examples.

FIG. 18 is a method 640 for increasing a cascade carry length (e.g., increasing the padding d) by compressing multiple separate multipliers in the SIMD structure, according to some examples. The method 640 of FIG. 18, like FIG. 16, attempts to distribute compression beginning at a separate multiplier in a MSB position in the register m through separate multipliers in less significant positions in the register m, without compressing the separate multiplier in the LSB position in the register m. By defining the compressed separate multipliers in such a manner, the cascade carry length (e.g., padding d) of the SIMD structure can be increased. The method 640 attempts to analytically identify a solution to implement an SIMD structure having a target padding.

In operation 642, an initial structure of the SIMD is determined. In operation 644, a compression floor f for a compressed separate multiplier and a target padding x are defined. In operation 646, a loop counter i is defined and initialized to the width s.

In operation 648, a determination is made whether the loop counter i is greater than the unusable bits e plus one (e.g., i>(e+1)). If so, in operation 650, the number of $b_i$-bits of separate multiplier $b_i$ is reduced by the difference between the target padding x and the padding d (e.g., $b_i=b_i-(x-d)$). If the loop counter i is not greater than the unusable bits e plus one, in operation 652, the number of $b_i$-bits of separate multiplier $b_i$ is reduced by the difference between the target padding x and the padding d plus one (e.g., $b_i=b_i-(x-d)+1$). After operations 650 and 652, the loop counter i is decremented in operation 654. In operation 656, a determination is made whether the loop counter i is less than or equal to one. If the loop counter i is not less than or equal to one, the method 640 loops to operation 648.

Conceptually, to increase the padding d to the target padding x, (x−d)(s−1) bits need to be made available to distribute (x−d) additional bits to each of the (s−1) instances of the padding d. The unusable bits e are available to be distributed to padding d to increase the padding d, and therefore, [(x−d)(s−1)−e] bits need to be made available by compressing separate multipliers. The loop in operations 648 through 656 reduces the separate multipliers b in positions s through (e+2) by the difference of the target padding x and the padding d, and reduces the separate multipliers b in positions (e+1) through 2 by one less than the difference of the target padding x and the padding d. Mathematically, the bits made available by the compression of the separate multipliers b can be illustrated by Equation (29) below:

$$(x-d)(s-(e+1))+(x-d-1)(e+1-1)=(x-d)(s-1)-e \qquad \text{Eq. (29)}.$$

The appropriate amount of reduction in bits is applied to the separate multipliers b based on their positions and the unusable bits e using the determination in operation 648 and the subsequent definition in operation 650 or 652.

Referring back to operation 656, if the loop counter is less than or equal to one, a determination is made whether the $b_s$-bits of the compressed separate multiplier $b_s$ in the MSB of the register m is greater than or equal to the compression floor fin operation 658. The separate multiplier $b_s$ in the MSB of the register m can have the most compression of all of the separate multipliers b, although other separate multipliers b can have a same compression. If not, the method 640, in operation 660, returns, e.g., to any calling function, with the initial structure determined in operation 642 without implementing any modification to that initial structure. If the $b_s$-bits of the compressed separate multiplier $b_s$ in the MSB of the register m is greater than or equal to the compression floor f, in operation 662, the padding d is defined to be equal to the target padding x. In operation 664, the padding d and the compressed separate multipliers $b_i$ are implemented to modify the initial structure determined in operation 642. Then, the method 640, in operation 660, returns, e.g., to any calling function.

The generalized SIMD structure of FIG. 17 can be achieved by the method 640 of FIG. 18, and hence, further description of a SIMD structure achieved by the method 640 of FIG. 18 is omitted.

Figure 19:
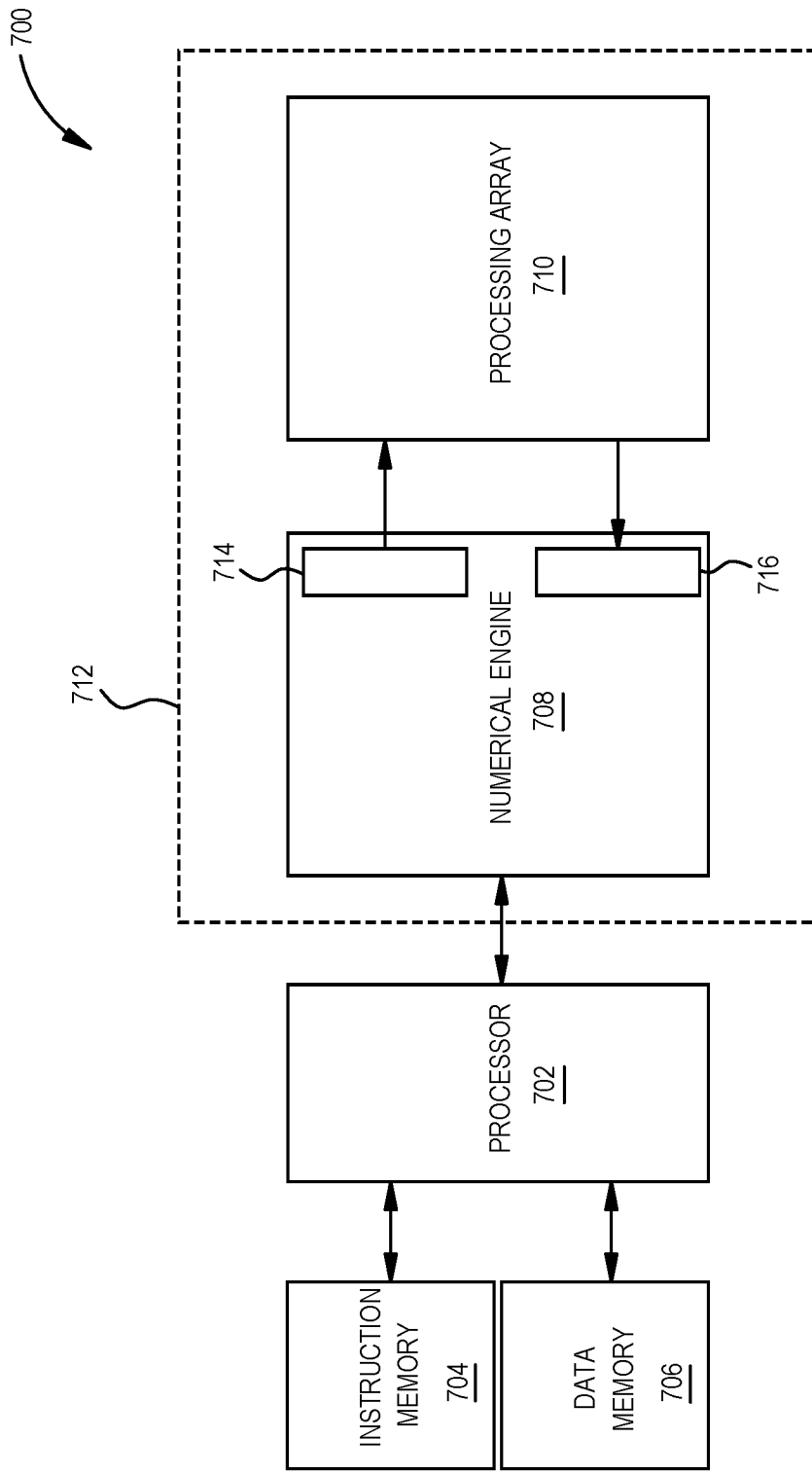
FIG. 19 is an example, simplified system, according to some examples.

FIG. 19 illustrates an example, simplified system 700 that may implement any of the foregoing methods, according to some examples. The system 700 can be implemented, for example, on a single integrated circuit chip or by various components disposed on separate chips communicatively coupled via, e.g., an interposer, package substrate, printed circuit board (PCB), etc. The system 700 may be used for any appropriate application, and in some specific examples, the system 700 is used to implement a convolutional neural network for processing images for edge detection.

The system 700 includes a processor 702, instruction memory 704, data memory 706, a numerical engine 708, and processing array 710. The processor 702 can be any type of general-purpose central processing unit (CPU), such as an x86-based processor, ARM®-based processor, or the like. The processor 702 can include one or more cores and associated circuitry (e.g., cache memories, memory management units (MMUs), interrupt controllers, etc.). The processor 702 is configured to execute program code that performs one or more operations described herein and which can be stored in the instruction memory 704, for example.

The processor 702 is communicatively coupled to the instruction memory 704 and the data memory 706. In some examples, one or more memory controllers may be communicatively between the processor 702 and each of the instruction memory 704 and the data memory 706 to enable data transfer and communications therebetween. Each of the instruction memory 704 and the data memory 706 is or includes a non-transitory storage medium. For example, the instruction memory 704 can be or include read-only memory (ROM) (such as flash memory, electrically erasable programmable ROM (EEPROM), etc.) and/or random access memory (RAM) (such as static RAM (SRAM) and dynamic RAM (DRAM), like double data rate (DDR) synchronous DRAM (SDRAM)). Further, for example, the data memory 706 can be or include RAM (such as SRAM and DRAM, like DDR SDRAM). The instruction memory 704 can store the instructions that the processor 702 executes, and the data memory 706 can store the data upon which the processor 702 executing the instructions operates and/or that the processor 702 generates.

The processor 702 can process and handle data. Arithmetic functions can be off-loaded from the processor 702 to the numerical engine 708 and the processing array 710. The numerical engine 708 can implement various logic and control functions to implement various arithmetic functions. For example, when the system 700 is used to implement a convolutional neural network, the numerical engine 708 can include or be a convolution engine. The numerical engine 708 can include or be a hardened processor, a soft processor instantiated on programmable logic, and/or any other logic instantiated on programmable logic. Example programmable logic is described below in the context of a field programmable gate array (FPGA). The numerical engine 708 is communicatively coupled to the processing array 710 for transmitting arithmetic instructions, such as SIMD multiply-accumulate (MAC) instructions, to the processing array 710 and receiving data generated by the processing array 710 by the execution of those arithmetic instructions. The processing array 710 can include an array of processor cores that can each be a hardened or soft processor. The processor cores may have a reduced instruction set to more efficiently execute instructions that may be received from the numerical engine 708. In the illustrated example, the numerical engine 708 (e.g., instantiated on programmable logic) and the processing array 710 are components on a same integrated circuit (IC) chip 712, such as part of a System-on-Chip (SoC). Accordingly, communications between the processor 702 and the numerical engine 708 can be between separate chips (e.g., communications received by the numerical engine 708 from the processor 702 are from off-chip).

A register m for receiving a SIMD MACC instruction by the processing array 710 has a bit-width set by the architecture of the processing array 710. Regardless of how data is packed into the register m, the processing array 710 can multiply the data packed into the register m in a same manner.

If a static SIMD structure is implemented by a SIMD MACC instruction, efficiency of the numerical engine 708 and processing array 710 may require more instructions and more executions than what may be performed if some data may be compressed in the SIMD structure. For example, assume that a static SIMD structure can accommodate three separate multipliers being packed therein with a cascade carry length of 2. Under such an assumption, two SIMD instructions would be implemented to multiply the four separate multipliers with a shared multiplicand. Similarly, under such an assumption, two SIMD instructions would be implemented to have a cascade carry length of 4 to multiply the three separate multipliers with shared multiplicands.

Using methods described herein, when the data is capable of being compressed, efficiency of the numerical engine 708 and processing array 710 can be increased. For example, assume that a SIMD structure can be modified to compress separate multipliers being packed therein. If the SIMD structure is modified from being able to include three uncompressed separate multipliers to being able to include four separate multipliers (one or more of which are compressed), one SIMD instruction may be implemented to multiply the four separate multipliers with a shared multiplicand. Similarly, if the SIMD structure is modified from being able to include three uncompressed separate multipliers with a cascade carry length of 2 to being able to include the three separate multipliers (one or more of which are compressed) with a cascade carry length of 4, one SIMD instructions may be implemented to have a cascade carry length of 4 to multiply the three separate multipliers with shared multiplicands. Hence, fewer instructions and/or executions may be implemented using a dynamic SIMD structure according to some methods described herein.

The processor 702 implements one or more of the methods described herein for determining a dynamic SIMD structure with one or more compressed separate multipliers to increase the width and/or cascade carry length and with one or more uncompressed separate multiplier. The processor 702 communicates an indication of the dynamic SIMD structure with the numerical engine 708 for packing and/or unpacking data into an SIMD instruction having the dynamic SIMD structure for communications with the processing array 710. The numerical engine 708 further includes packing logic 714 to compress, if appropriate, and pack data into an SIMD structure, which will be communicated to the processing array 710. The numerical engine 708 also includes unpacking logic 716 to read data communicated from the processing array 710.

Figure 20:
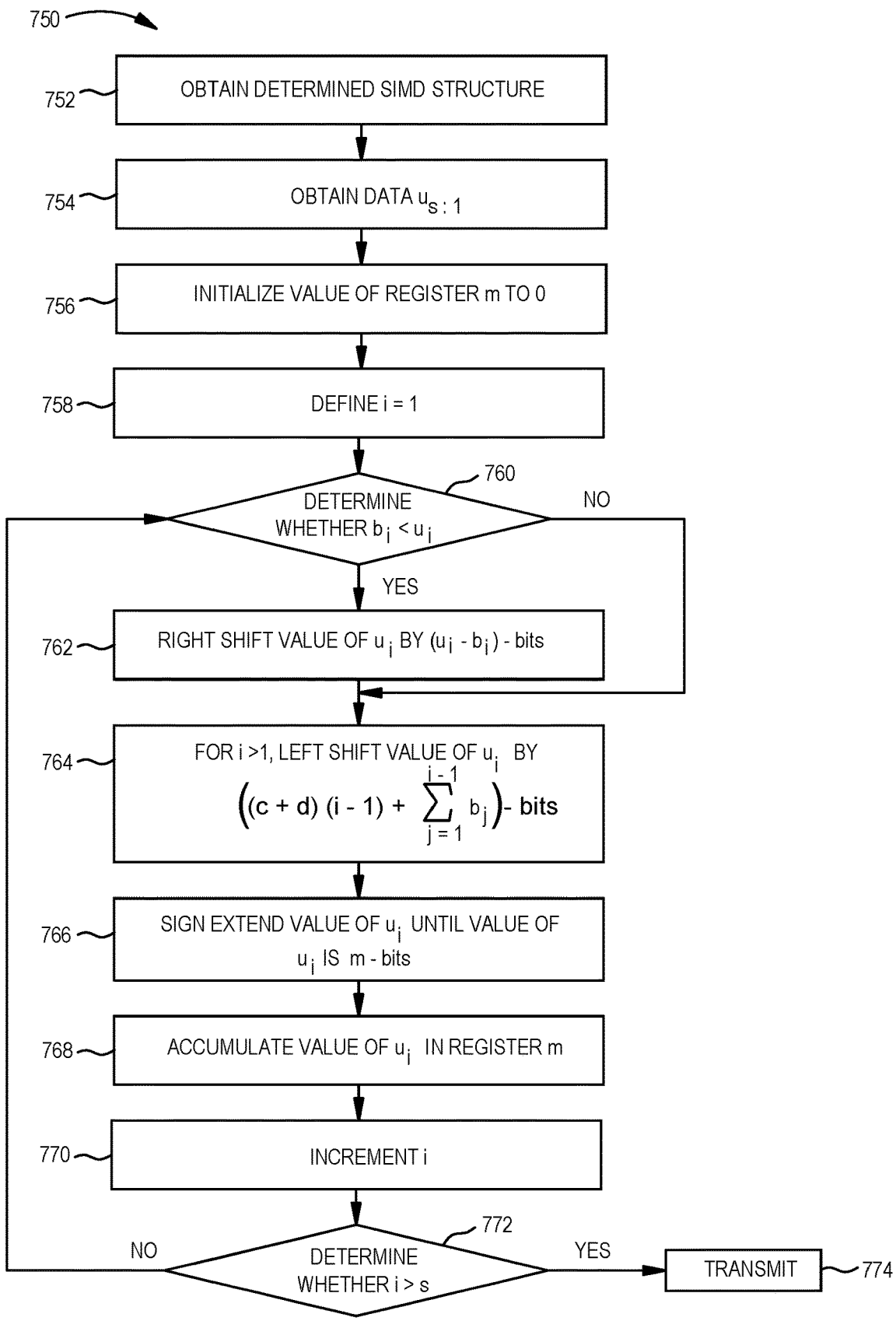
FIG. 20 is a method for packing a SIMD structure, according to some examples.

FIG. 20 illustrates a method 750 for packing a SIMD structure according to some examples. The method 750, in reference to the system 700 of FIG. 19, is implemented by the packing logic 714. In operation 752, the determined SIMD structure is obtained. The SIMD structure is determined by the processor 702 by implementing any of the foregoing methods, for example. The processor 702 communicates the determined SIMD structure to the numerical engine 708, which passes the determined SIMD structure to the packing logic 714.

In operation 754, the data $u_{s:1}$ to be packed as separate multipliers into the SIMD structure is obtained. For example, the data u is read from the data memory 706 by the processor 702, and the processor 702 communicates the data u to the numerical engine 708. The data u is $u_i$-bits for instances i=s to 1. Generally, the $u_i$-bits for instances i=s to 1 will each be equal to the b-bits of separate multipliers b when determining an initial SIMD structure as described above, although the $u_i$-bits for instances i=s to 1 can vary. An order and/or register in which data $u_{s:1}$ is received indicates a packing order in the SIMD structure. For example, data $u_s$ is to be packed as separate multiplier $b_s$ in the SIMD structure, and data $u_i$ is to be packed as separate multiplier $b_i$ in the SIMD structure. The processor 702 can communicate the data u in the order to be packed in the SIMD structure, and/or the numerical engine 708 can determine the order. The numerical engine 708 passes the data $u_{s:1}$ to the packing logic 714, and more particularly, passes the data $u_{s:1}$ in an order such that data $u_s$ is most tolerant of compression and data $u_1$ is least tolerant of compression, with data having decreasing tolerance(s) of compression therebetween. The processor 702 and/or numerical engine 708 can determine these tolerances of compression, such as by using a quantization error analysis or other analysis.

In operation 756, a value of the register m is initialized to zero, and in operation 758, a loop counter i is defined and initialized to one. In operation 760, a determination is made whether $b_i$-bits is less than $u_i$-bits. If $b_i$-bits is less than $u_i$-bits, compression is to occur. Hence, if so, in operation 762, the value of the data $u_i$ is right-shifted by ($u_i-b_i$)-bits. Operation 762 compresses the data $u_i$ to the $b_i$-bits determined by the SIMD structure. If $b_i$-bits is not less than $d_i$-bits, operation 762 is bypassed.

Then, in operation 764, when the loop counter i is greater than 1, the value of data $u_i$ (compressed by operation 762 or uncompressed if operation 762 is bypassed) is left shifted to align the value of the data $u_i$ to the appropriate bits in the register m. The value of the data $u_i$ is left shifted to the $b_i$-bits of separate multiplier $b_i$ in the register m. Accordingly, the value of the data $u_i$ is left shifted by $((c+d)(i-1)+\Sigma_{j=1}^{i-1} b_j)$-bits (e.g., the number of less significant bits in register m relative to the placement of separate multiplier $b_i$ in the register m).

In operation 766, after any left shifting in operation 764, the value of the data $u_i$ is sign extended until the value of the data $u_i$ is m-bits in length. In operation 768, the sign extended value of data $u_i$ is accumulated in the register m. In operation 770, the loop counter i is incremented. In operation 772, a determination is made whether the loop counter i is greater than the width s of the determined SIMD structure. If the loop counter i is not greater than the width s, the method 750 loops back to operation 760. If the loop counter i is greater than the width s, the data u has been packed into the SIMD structure in the register m, and the SIMD is transmitted, e.g., to the processing array 710, in operation 774.

As apparent from the method 750, the separate multipliers b of the SIMD structure are written to the register m by starting with the separate multiplier $b_1$ in the least significant position in the register m and incrementally writing or accumulating the separate multiplier b in the next more significant position of the register m. Before writing each separate multiplier b, the right shifting of the data u, where appropriate, compresses the data u to be written as a compressed separate multiplier b. The left shifting of the data u aligns the data u with appropriate bits of the register m. The values of the separate multipliers b written to the register m by the method 750 may be one less than the actual, compressed value due to the sign extension and accumulation. Subsequent processing, such as during unpacking, can accommodate for this change in value. The left shifting, sign extension, and accumulation can also ensure that the corresponding minimum spacing c and padding d are appropriately written in the register m.

Figure 21:
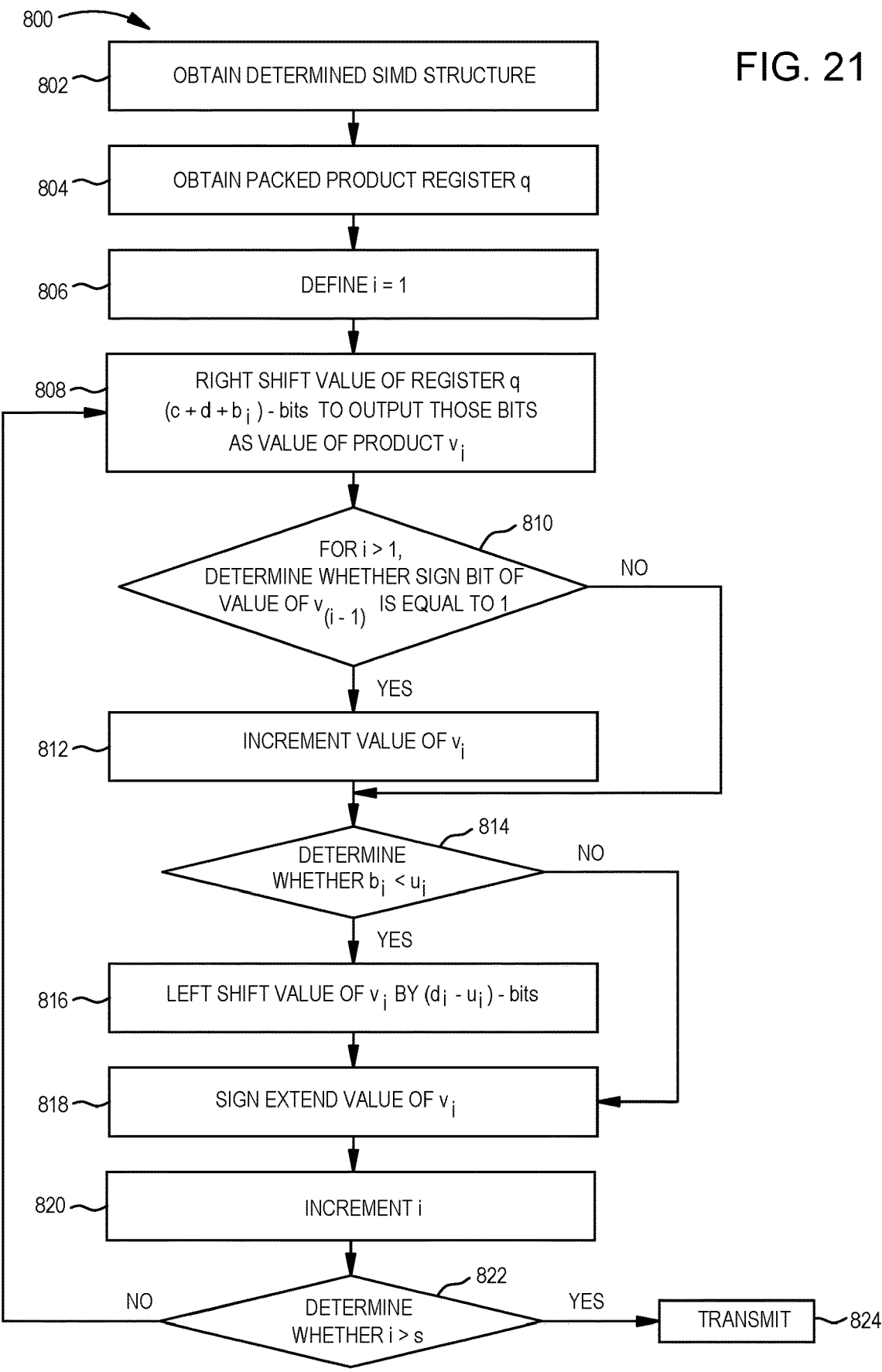
FIG. 21 is a method for unpacking a product register based on the SIMD structure, according to some examples.

FIG. 21 illustrates a method 800 for unpacking a product register q based on the SIMD structure according to some examples. The method 800, in reference to the system 700 of FIG. 19, is implemented by the unpacking logic 716. In operation 802, the determined SIMD structure is obtained. The SIMD structure is determined by the processor 702 as previously described. The processor 702 communicates the determined SIMD structure to the numerical engine 708, which passes the determined SIMD structure to the unpacking logic 716.

In operation 804, a packed product register q is obtained, such as by receipt from the processing array 710. The packed product register q includes s-number of products p, with each product p having a product width t. The position of each product p in the register q corresponds to a position of the separate multiplier b in the register m whose data is multiplied with the data of the shared multiplicand a to obtain the data of that product p. For example, data of product $p_s$ (e.g., in the most significant position of register q) is the product of multiplying the data of the separate multiplier $b_s$ in the register m with the data of the shared multiplicand a, and data of the product $p_1$ (e.g., in the least significant position of register q) is the product of multiplying the data of the separate multiplier $b_1$ in the register m with the data of the shared multiplicand a. The product width t of each product p is equal to the corresponding separate multiplier b, the shared multiplicand a, and padding d (e.g., $t_i = a + b_i + d$).

In operation 806, a loop counter i is defined and initialized to one. In operation 808, the value of register q is right shifted by $(c+d+b_i)$-bits to output those bits as the value of the product $v_i$. Then, in operation 810, when the loop counter i is greater than one, a determination is made whether the sign bit of the value of the product $v_{(i-1)}$ is equal to one (e.g., the value of the product $v_{(i-1)}$ is negative). If the sign bit of the value of the product $v_{(i-1)}$ is equal to one, in operation 812, the value of the product $v_i$ is incremented; and if not, operation 812 is bypassed.

Then, in operation 814, a determination is made whether $b_i$-bits is less than $u_i$-bits. If $b_i$-bits is less than $u_i$-bits, compression previously occurred. Hence, if so, in operation 816, the value of the product $v_i$ is left-shifted by $(u_i - b_i)$-bits. Operation 816 decompresses the product $v_i$ from the $b_i$-bits determined by the SIMD structure. If $b_i$-bits is not less than $d_i$-bits, operation 816 is bypassed. In operation 818, the value of product $v_i$ is sign extended.

In operation 820, the loop counter i is incremented. In operation 822, a determination is made whether the loop counter i is greater than the width s of the determined SIMD structure. If the loop counter i is not greater than the width s, the method 800 loops back to operation 808. If the loop counter i is greater than the width s, the product register q has been unpacked, and the unpacked products v can be transmitted to another circuit in operation 824 (e.g., to the processor 702). The products v can be written to different locations in memory, different registers, or the like.

Figure 22:
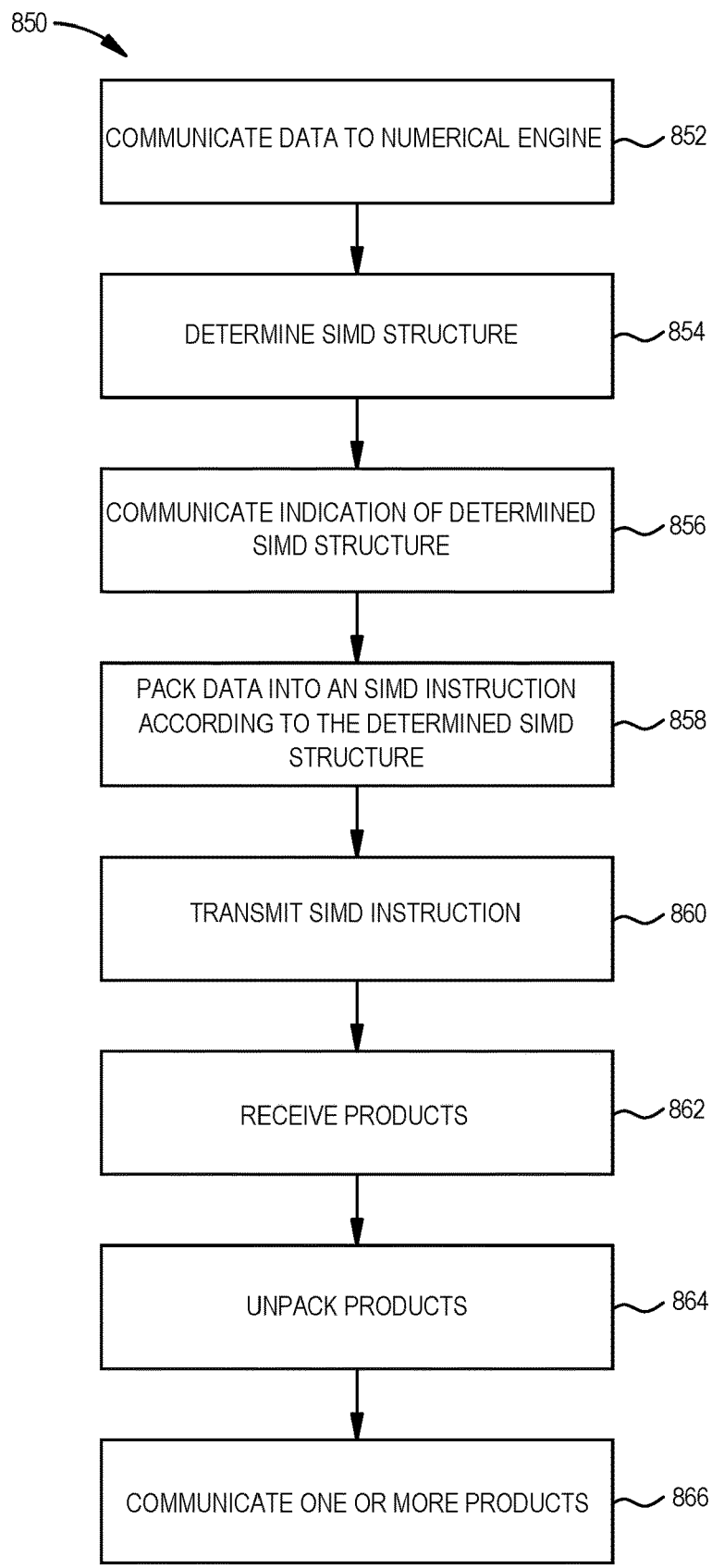
FIG. 22 is a method for implementing a SIMD instruction using a dynamic SIMD structure, according to some examples.

FIG. 22 illustrates a method 850 for implementing a SIMD instruction using a dynamic SIMD structure according to some examples. The method 850 is described in the context of the system 700 of FIG. 19, which implements a convolutional neural network, as an example.

In a convolutional neural network implementing examples above, in operation 852, the processor 702 can communicate data (e.g., weights and activations) to the numerical engine 708. In operation 854, the processor 702 determines the SIMD structure according to any of the foregoing methods. More specifically, the processor 702 determines an initial SIMD structure and subsequently modifies the initial SIMD structure to obtain an increased width or padding as described above. In operation 856, the processor 702 communications an indication of the dynamically determined SIMD structure to the numerical engine 708.

The weights and activations can be stored in data memory 706 that the processor 702 reads. The processor 702 can transmit to the numerical engine 708 the activations, e.g., at runtime, and the weights for each layer of the neural network. The processor 702 can further determine which weights can tolerate compression and a priority of which weights that are subject to compression. The processor 702 communicates these weights to the numerical engine 708 in a SIMD structure that corresponds to the SIMD structure that the processor 702 determines. For example, the SIMD structure of the communication from the processor 702 to the numerical engine 708 can contain the data $u_{s:1}$ in the order that the data $u_{s:1}$ is to be packed into the SIMD structure that is to be subsequently transmitted to the processing array 710. The communication from the processor 702 to the numerical engine 708 can omit minimum spacing c and padding d between neighboring data u. By the processor 702 communicating the weights to the numerical engine 708 in such a manner, the format of the communication can indicate to the numerical engine 708 what data u may be subject to compression.

The numerical engine 708, in operation 858, then packs the data (e.g., weights) into an SIMD instruction according to the dynamically determined SIMD structure and, in operation 860, transmits the SIMD to the processing array 710. The packing of operation 858 can be by the packing logic 714 according to the method 750 of FIG. 20. The processing array 710 can perform, e.g., matrix multiplication on the weights and activations to obtain partial products. The partial products may be communicated back to the numerical engine 708 from the processing array 710, such as when the desired number of multiplications have been performed or the number of multiply-accumulate (MAC) that can be accommodated by the padding d have been performed. Hence, in operation 862, the products are received by the numerical engine 708. In operation 864, the numerical engine 708 unpacks the products. The unpacking of operation 864 can be by the unpacking logic 716 according to the method 800 of FIG. 21.

The partial products can be processed by the numerical engine 708 and transmitted to the processing array 710 via another SIMD instruction to continue performing multiplications on the partial products, until, e.g., the desired number of multiplications have been performed. In operation 866, one or more of the products generated by the processing array 710 are communicated from the numerical engine 708 to the processor 702. The processor 702 may perform post-processing on the products depending on the application.

Figure 23:
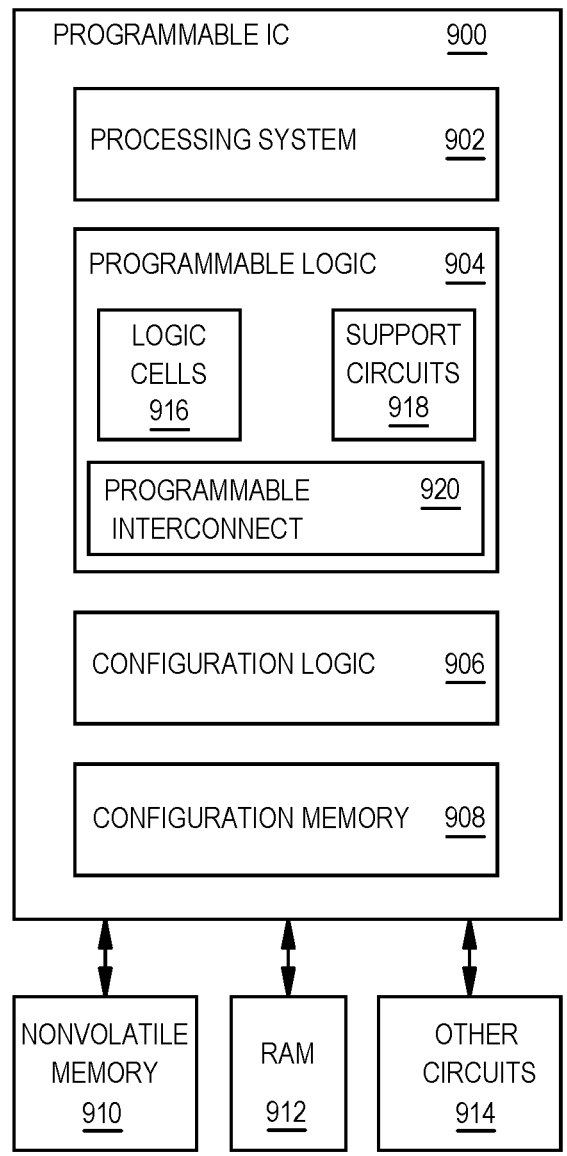
FIG. 23 is a block diagram depicting a programmable integrated circuit (IC), according to some examples.

FIG. 23 is a block diagram depicting a programmable integrated circuit (IC) 900 according to an example. The programmable IC 900 can implement the integrated circuit (IC) chip 712 of system 700 of FIG. 19, in whole or in part. The programmable IC 900 includes a processing system 902, programmable logic 904, configuration logic 906, and configuration memory 908. The programmable IC 900 can be coupled to external circuits, such as nonvolatile memory 910, RAM 912, and other circuits 914.

The processing system 902 can include microprocessor(s), memory, support circuits, IO circuits, and the like. The programmable logic 904 includes logic cells 916, support circuits 918, and programmable interconnect 920. The logic cells 916 include circuits that can be configured to implement general logic functions of a plurality of inputs. The support circuits 918 include dedicated circuits, such as transceivers, input/output blocks, digital signal processors, memories, and the like. The logic cells and the support circuits 918 can be interconnected using the programmable interconnect 920. Information for programming the logic cells 916, for setting parameters of the support circuits 918, and for programming the programmable interconnect 920 is stored in the configuration memory 908 by the configuration logic 906. The configuration logic 906 can obtain the configuration data from the nonvolatile memory 910 or any other source (e.g., the RAM 912 or from the other circuits 914).

Figure 24:
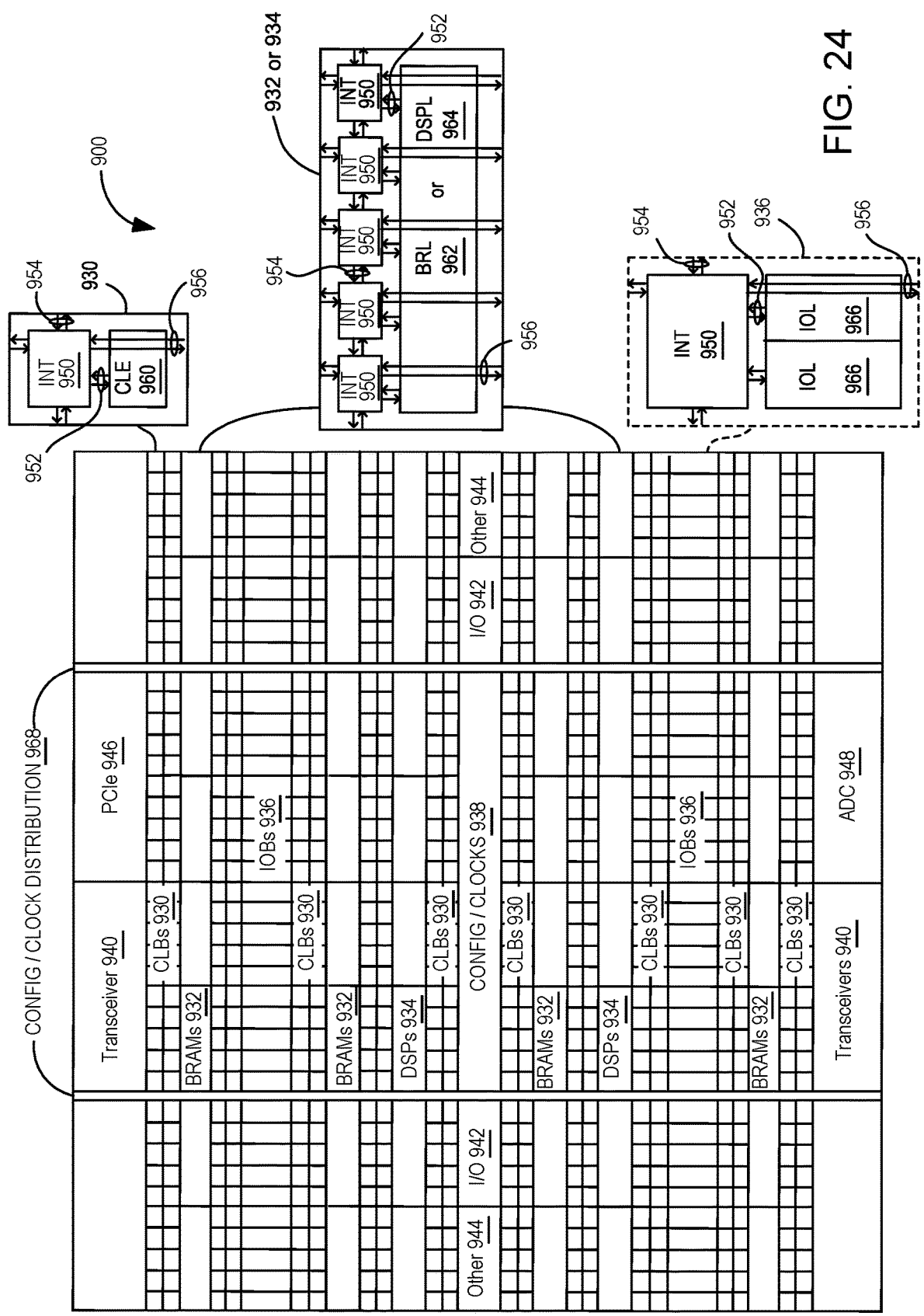
FIG. 24 is a field programmable gate array (FPGA) implementation of the programmable IC, according to some examples.

FIG. 24 illustrates an FPGA implementation of the programmable IC 900 that includes a large number of different programmable tiles including configurable logic blocks ("CLBs") 930, random access memory blocks ("BRAMs") 932, signal processing blocks ("DSPs") 934, input/output blocks ("IOBs") 936, configuration and clocking logic ("CONFIG/CLOCKS") 938, digital transceivers 940, specialized input/output blocks ("I/O") 942 (e.g., configuration ports and clock ports), and other programmable logic 944 such as digital clock managers, system monitoring logic, and so forth. The FPGA can also include PCIe interfaces 946, analog-to-digital converters (ADC) 948, and the like.

In some FPGAs, each programmable tile can include at least one programmable interconnect element ("INT") 950 having connections to input and output terminals 952 of a programmable logic element within the same tile, as shown by examples included in FIG. 24. Each programmable interconnect element 950 can also include connections to interconnect segments 954 of adjacent programmable interconnect element(s) in the same tile or other tile(s). Each programmable interconnect element 950 can also include connections to interconnect segments 956 of general routing resources between logic blocks (not shown). The general routing resources can include routing channels between logic blocks (not shown) comprising tracks of interconnect segments (e.g., interconnect segments 956) and switch blocks (not shown) for connecting interconnect segments. The interconnect segments of the general routing resources (e.g., interconnect segments 956) can span one or more logic blocks. The programmable interconnect elements 950 taken together with the general routing resources implement a programmable interconnect structure ("programmable interconnect") for the illustrated FPGA.

In an example implementation, a CLB 930 can include a configurable logic element ("CLE") 960 that can be programmed to implement user logic plus a single programmable interconnect element ("INT") 950. A BRAM 932 can include a BRAM logic element ("BRL") 962 in addition to one or more programmable interconnect elements. Typically, the number of interconnect elements included in a tile depends on the height of the tile. In the pictured example, a BRAM tile has the same height as five CLBs, but other numbers (e.g., four) can also be used. A signal processing block 934 can include a DSP logic element ("DSPL") 964 in addition to an appropriate number of programmable interconnect elements. An 10B 936 can include, for example, two instances of an input/output logic element ("IOL") 966 in addition to one instance of the programmable interconnect element 950. As will be clear to those of skill in the art, the actual I/O pads connected, for example, to the input/output logic element 966 typically are not confined to the area of the input/output logic element 966.

In the pictured example, a horizontal area near the center of the die is used for configuration, clock, and other control logic. Vertical columns 968 extending from this horizontal area or column are used to distribute the clocks and configuration signals across the breadth of the FPGA.

Some FPGAs utilizing the architecture illustrated in FIG. 24 include additional logic blocks that disrupt the regular columnar structure making up a large part of the FPGA. The additional logic blocks can be programmable blocks and/or dedicated logic.

Note that FIG. 24 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 24 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

While the foregoing is directed to specific examples, other and further examples may be devised without departing from the basic scope thereof, and the scope thereof is determined by the claims that follow.

What is claimed is:

1. A method for processing data, the method comprising:
   determining, by a processor, a first single instruction, multiple data (SIMD) structure;
   altering, by the processor, a characteristic of the first SIMD structure to obtain a second SIMD structure;
   communicating an indication of the second SIMD structure from the processor to a numerical engine;
   packing, by the numerical engine, data into an SIMD instruction according to the second SIMD structure, packing the data into the SIMD instruction including compressing at least some of the data packed into the SIMD instruction; and
   transmitting the SIMD instruction from the numerical engine.

2. The method of claim 1, wherein determining the first SIMD includes:
   determining a minimum spacing between neighboring instances of a separate multiplier, determining the minimum spacing being based on a shared multiplicand;
   determining an SIMD width of the first SIMD structure based on the minimum spacing, a given number of bits of the separate multiplier, and a given number of bits of the first SIMD structure; and
   determining a padding based on the given number of bits of the first SIMD structure, the SIMD width, the given number of bits of the separate multiplier, and the minimum spacing; and
   wherein the first SIMD structure includes:
   (i) a number of instances of the separate multiplier that is equal to the SIMD width, each instance of the separate multiplier having the given number of bits of the separate multiplier, and (ii) a number of instances of the padding and the minimum spacing that is equal to the SIMD width minus one, each instance of the padding and the minimum spacing being disposed between a neighboring pair of instances of the separate multiplier in the first SIMD structure.

3. The method of claim 2, wherein altering the characteristic of the first SIMD structure to obtain the second SIMD structure includes:
increasing the SIMD width comprising inserting an instance of a compressed separate multiplier and an instance of the padding and the minimum spacing in the first SIMD structure to obtain the second SIMD structure.

4. The method of claim 2, wherein altering the characteristic of the first SIMD structure to obtain the second SIMD structure includes:
increasing the SIMD width to a target width comprising:
determining a count of instances of a first compressed separate multiplier having a compression floor, the given number of bits of the first SIMD structure being equal to or greater than a sum of (i) the compression floor times the count, (ii) the given number of bits of the separate multiplier times the target width minus the count, and (iii) a product of one less than the target width and the sum of the minimum spacing and the padding; and
determining a compression amount for one instance of a second compressed separate multiplier, the compression amount being equal to the given number of bits of the first SIMD structure minus the sum of (A) the product of (i) one less than the target width and (ii) the sum of the minimum spacing and the padding, (B) the compression floor times the count, and (C) a product of (i) the given number of bits of the separate multiplier and ii the target width minus the count minus one; and
wherein the second SIMD structure includes the count of instances of the first compressed separate multiplier having the compression floor, the one instance of the second compressed separate multiplier having the compression amount, and a modified number of instances of the separate multiplier having the given number of bits of the separate multiplier, the modified number being the target width minus the count minus one.

5. The method of claim 2, wherein altering the characteristic of the first SIMD structure to obtain the second SIMD structure includes:
increasing the SIMD width to a target width comprising:
iteratively until the SIMD width equals the target width:
incrementing the SIMD width and inserting one instance of the separate multiplier; and
iteratively decrementing a number of bits of an individual instance of the separate multiplier, except at least one instance of the separate multiplier that is not to be compressed, until a sum of (A) a product of (i) one less than the incremented SIMD width and (ii) a sum of padding and the minimum spacing and (B) each instance of the separate multiplier; and
wherein the second SIMD structure includes one or more instances of the separate multiplier each having a decremented number of bits and the at least one instance of the separate multiplier having the given number of bits of the separate multiplier.

6. The method of claim 2, wherein altering the characteristic of the first SIMD structure to obtain the second SIMD structure includes:
increasing the SIMD width to a target width comprising:
defining a compression variable equal to the given number of bits of the separate multiplier; and
iteratively until the SIMD width equals the target width:
initializing a counter to zero;
decrementing the compression variable;
iteratively incrementing the counter until (A) the given number of bits of the first SIMD structure is greater than or equal to the given number of bits of the separate multiplier minus the counter and plus a product of (i) one less than the target width and (ii) a sum of (a) the decremented compression variable, (b) the minimum spacing, (c) the padding, and (d) one, or (B) the counter is equal to or greater than the target width; and
setting the SIMD width equal to the target width when the given number of bits of the first SIMD structure is greater than or equal to the given number of bits of the separate multiplier minus the counter and plus a product of (i) one less than the target width and (ii) a sum of (a) the decremented compression variable, (b) the minimum spacing, (c) the padding, and (d) one; and
wherein the second SIMD structure includes:
a first number of instances of the separate multiplier each having a number of bits equal to the compression variable, the first number being equal to the counter;
a second number of instances of the separate multiplier each having a number of bits equal to the compression variable plus one, the second number being equal to the target width minus the counter minus one; and
at least one instance of the separate multiplier having the given number of bits of the separate multiplier.

7. The method of claim 2, wherein altering the characteristic of the first SIMD structure to obtain the second SIMD structure includes:
increasing the SIMD width to a target width comprising:
defining a compression variable equal to a given number of bits of the separate multiplier; and
iteratively until the SIMD width equals the target width:
decrementing the compression variable;
defining a counter equal to the given number of bits of the separate multiplier minus the given number of bits of the first SIMD structure plus a product of (A) one less than the target width and (B) a sum of the decremented compression variable, the padding, the minimum spacing, and one; and
setting the SIMD width equal to the target width when the counter is equal to or less than the target width minus one; and
wherein the second SIMD structure includes:
a first number of instances of the separate multiplier each having a number of bits equal to the compression variable, the first number being equal to the counter;
a second number of instances of the separate multiplier each having a number of bits equal to the compression variable plus one, the second number being equal to the target width minus the counter minus one; and at least one instance of the separate multiplier having the given number of bits of the separate multiplier.

8. The method of claim 2, wherein altering the characteristic of the first SIMD structure to obtain the second SIMD structure includes:
increasing the padding to a target padding comprising:
defining the respective number of bits of at least one of the instances of the separate multiplier to be equal to (A) the given number of bits of the separate multiplier plus (B) unusable bits of the first SIMD structure minus (C) a product of (i) one less than the SIMD width and (ii) the target padding minus the padding; and
defining the padding to be equal to the target padding.

9. The method of claim 2, wherein altering the characteristic of the first SIMD structure to obtain the second SIMD structure includes:
increasing the padding to a target padding comprising:
determining a count of instances of a first compressed separate multiplier having a compression floor, the given number of bits of the first SIMD structure being equal to or greater than a sum of (i) the compression floor times the count, (ii) the given number of bits of the separate multiplier times the SIMD width minus the count, and (iii) a product of the one less than the SIMD width and the sum of the minimum spacing and the target padding; and
determining a compression amount for one instance of a second compressed separate multiplier, the compression amount being equal to the given number of bits of the first SIMD structure minus the sum of (A) a product of Lg one less than the SIMD width and (ii) the sum of the target padding and the minimum spacing, (B) the compression floor times the count, and (C) a product of (i) the given number of bits of the separate multiplier and (ii) the SIMD width minus the count minus one; and
wherein the second SIMD structure includes the count of instances of the first compressed separate multiplier having the compression floor, the one instance of the second compressed separate multiplier having the compression amount, and a modified number of instances of the separate multiplier having the given number of bits of the separate multiplier, the modified number being the SIMD width minus the count minus one.

10. The method of claim 2, wherein altering the characteristic of the first SIMD structure to obtain the second SIMD structure includes:
increasing the padding to a target padding comprising:
iteratively until the padding is equal to or greater than the target padding:
incrementing the padding; and
iteratively decrementing a number of bits of an individual instance of the separate multiplier, except at least one instance of the separate multiplier that is not to be compressed, until a total number of bits decremented from the instances of the separate multiplier is equal to or greater than the SIMD width minus unusable bits minus one; and
wherein the second SIMD structure includes one or more instances of the separate multiplier each having a decremented number of bits and the at least one instance of the separate multiplier having the given number of bits of the separate multiplier.

11. The method of claim 2, wherein altering the characteristic of the first SIMD structure to obtain the second SIMD structure includes:
increasing the padding to a target padding comprising:
reducing bits of a first number of instances of the separate multiplier by the target padding minus the padding, the first number of instances being the SIMD width minus unusable bits minus one; and
reducing bits of a second number of instances of the separate multiplier by the target padding minus the padding plus one, the second number of instances being the unusable bits; and
wherein the second SIMD structure includes:
the first number of instances of the separate multiplier each having the given number of bits of the separate multiplier reduced by the target padding minus the padding;
the second number of instances of the separate multiplier each having the given number of bits of the separate multiplier reduced by the target padding minus the padding minus one; and
at least one instance of the separate multiplier having the given number of bits of the separate multiplier.

12. The method of claim 1, wherein packing the data into the SIMD instruction according to the second SIMD structure includes:
initializing a register to zero; and
for each instance of the data:
right-shifting a value of the respective instance of the data when bits of the respective instance of the data is greater than bits of a corresponding instance of a separate multiplier of the second SIMD structure;
left-shifting the value of the respective instance of the data to align the value of the respective instance of the data with a position of the corresponding instance of the separate multiplier;
sign-extending the value of the respective instance of the data to a given number of bits of the register; and
accumulating the value of the respective instance of the data in the register.

13. The method of claim 1 further comprising unpacking products received by the numerical engine in response to the SIMD instruction, unpacking the products comprising:
obtaining the products in a packed product register; and
iteratively:
right-shifting a value of the packed product register by a sum of a number of bits of a corresponding instance of a separate multiplier of the second SIMD structure, a padding, and a minimum spacing to output a value of one of the products;
incrementing the value of the one of the products when a value of a product in an immediately less significant position in the packed product register is negative; and
left-shifting the value of the one of the products when bits of a corresponding instance of the data packed into the SIMD instruction is greater than bits of the corresponding instance of the separate multiplier of the second SIMD structure.

14. A system for processing data, the system comprising:
numerical engine circuitry comprising packing logic circuitry and unpacking logic circuitry, the numerical engine circuitry being configured to be communicatively coupled to a first processor and at least one second processor, wherein:
the numerical engine circuitry is operable to receive an indication of a dynamic SIMD structure from the first processor, the dynamic SIMD structure having a number of instances of a compressed separate multiplier and at least one instance of an uncompressed separate multiplier, a number of bits of the compressed separate multiplier being less than a number of bits of the uncompressed separate multiplier;

the packing logic circuitry is operable to pack data into a SIMD instruction based on the indication of the dynamic SIMD structure; and the unpacking logic circuitry is operable to unpack products from a response received from the at least one second processor, unpacking the products being based on the dynamic SIMD structure.

15. The system of claim 14, wherein the numerical engine circuitry is implemented in programmable logic circuitry.

16. The system of claim 14, wherein the packing logic circuitry is operable to:

initialize a register to zero; and for each instance of the data:

right-shift a value of the respective instance of the data when the bits of the respective instance of the data is greater than bits of a corresponding instance of the separate multiplier of the dynamic SIMD structure;

left-shift the value of the respective instance of the data to align the value of the respective instance of the data with a position of the corresponding instance of the separate multiplier of the dynamic SIMD structure;

sign-extend the shifted value of the respective instance of the data to a given number of bits of the register; and accumulate the value of the respective instance of the data in the register.

17. The system of claim 14, wherein the packing logic circuitry is operable to:

obtain the products in a packed product register; and iteratively:

right-shift a value of the packed product register by a sum of a number of bits of a corresponding instance of the separate multiplier in the dynamic SIMD structure, a padding, and a minimum spacing to output a value of one of the products;

increment the value of the one of the products when a value of a product in an immediately less significant position in the packed product register is negative; and left-shift the value of the one of the products when bits of the respective instance of the data packed into the SIMD instruction is greater than bits of a corresponding instance of the separate multiplier of the dynamic SIMD structure.

18. A method for processing data, the method comprising: using one or more circuits:

determining a first single instruction, multiple data (SIMD) structure, the first SIMD structure including a number of instances of a separate multiplier and including a minimum spacing and a padding disposed between neighboring instances of the separate multiplier, wherein a width of the first SIMD structure is the number of instances of the separate multiplier in the first SIMD structure;

increasing a characteristic of the first SIMD structure to obtain a second SIMD structure, the characteristic being the width or the padding, the second SIMD structure including at least one compressed instance of the separate multiplier and at least one uncompressed instance of the separate multiplier;

packing data into an SIMD instruction according to the second SIMD structure; and transmitting the SIMD instruction from the one or more circuits.

19. The method of claim 18, wherein the characteristic is the width.

20. The method of claim 18, wherein the characteristic is the padding.

* * * * *

UNITED STATES PATENT AND TRADEMARK OFFICE
CERTIFICATE OF CORRECTION

PATENT NO. : 10,824,434 B1
APPLICATION NO. : 16/204991
DATED : November 3, 2020
INVENTOR(S) : Sean Settle et al.

Page 1 of 1

It is certified that error appears in the above-identified patent and that said Letters Patent is hereby corrected as shown below:

In the Specification

Column 8, Line 5, Delete "$e=m-(s-1)(c+d)-\Sigma_{j=1}^{s}b_j$" and insert -- $e = m - (s - 1)(c + d) - \sum_{j=1}^{s} b_j$ --, therefor.

Column 12, Line 55, Delete "$(\hat{b}'++x)$" and insert -- $(\hat{b}' + c + x)$ --, therefor.

Column 13, Line 27, Delete "$(\hat{b}'++x)$" and insert -- $(\hat{b}' + c + x)$ --, therefor.

Column 16, Line 41, Delete "b" and insert -- $\hat{b}$ --, therefor.

Column 17, Line 16, Delete "b," and insert -- $\hat{b}$, --, therefor.

Column 18, Line 8, Delete "b" and insert -- $\hat{b}$ --, therefor.

Column 18, Line 10, Delete "b" and insert -- $\hat{b}$ --, therefor.

Column 18, Line 11, Delete "b" and insert -- $\hat{b}$ --, therefor.

Column 18, Line 13, Delete "b" and insert -- $\hat{b}$ --, therefor.

Column 18, Line 29, Delete "b" and insert -- $\hat{b}$ --, therefor.

Column 18, Line 31, Delete "b" and insert -- $\hat{b}$ --, therefor.

Column 18, Line 33, Delete "b" and insert -- $\hat{b}$ --, therefor.

In the Claims

Column 31, Line 34, In Claim 9, delete "Lg" and insert -- (i) --, therefor.

Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*